US012465467B2

(12) United States Patent
Juul et al.

(10) Patent No.: US 12,465,467 B2
(45) Date of Patent: Nov. 11, 2025

(54) SYSTEM AND METHOD FOR SCANNING A DENTAL OBJECT

(71) Applicant: 3SHAPE A/S, Copenhagen K (DK)

(72) Inventors: Frederik Juul, Copenhagen K (DK); Mette Båstrup-Larsen, Copenhagen K (DK); Edward Matos, Copenhagen K (DK); Jesper Simonsen, Copenhagen K (DK)

(73) Assignee: 3Shape A/S, Kobenhavn K (DK)

( * ) Notice: Subject to any disclaimer, the term of this patent is extended or adjusted under 35 U.S.C. 154(b) by 322 days.

(21) Appl. No.: 18/001,656

(22) PCT Filed: Aug. 17, 2021

(86) PCT No.: PCT/EP2021/072832
§ 371 (c)(1),
(2) Date: Dec. 13, 2022

(87) PCT Pub. No.: WO2022/038134
PCT Pub. Date: Feb. 24, 2022

(65) Prior Publication Data
US 2023/0329846 A1 Oct. 19, 2023

(30) Foreign Application Priority Data
Aug. 17, 2020 (DK) .......................... PA 2020 70536

(51) Int. Cl.
*A61C 9/00* (2006.01)
*G16H 10/60* (2018.01)
(Continued)

(52) U.S. Cl.
CPC .......... *A61C 9/0066* (2013.01); *G16H 10/60* (2018.01); *G06T 7/00* (2013.01); *G06T 2207/30036* (2013.01); *G16H 30/20* (2018.01)

(58) Field of Classification Search
CPC .... A61C 9/0066; A61C 9/0053; G16H 10/60; G16H 30/20; G16H 30/40; G06T 7/00;
(Continued)

(56) References Cited

U.S. PATENT DOCUMENTS 10,380,212 B2 * 8/2019 Elbaz ................. G06F 16/9535
10,507,087 B2 * 12/2019 Elbaz ....................... A61B 1/24
(Continued)

FOREIGN PATENT DOCUMENTS

| EP | 3108850 A2 | 12/2016 |
| EP | 3462373 A1 | 4/2019 |
| WO | 2019010127 A1 | 1/2019 |

OTHER PUBLICATIONS

International Search Report (PCT/ISA/210) and Written Opinion (PCT/ISA/237) mailed on Nov. 30, 2021, by the European Patent Office as the International Searching Authority for International Application No. PCT/EP2021/072832. (9 pages).

*Primary Examiner* — Vijay Shankar
(74) *Attorney, Agent, or Firm* — BUCHANAN INGERSOLL & ROONEY PC

(57) ABSTRACT

A dental scanning system includes an illumination unit including a light source configured to illuminate the dental object; a detector unit including a sensor configured to receive a plurality of two-dimensional images in response to the illumination of the dental object; a processor configured to generate a processed data by processing one or more of the plurality of two-dimensional images, wherein a three-dimensional digital representation of the dental object is generated based on the processed data; a wireless network unit configured to wirelessly connect the dental scanning system to a network comprising a plurality of network elements including at least one network element configured to receive the processed data; and a network operation module including a session module configured to establish (Continued)

the scanning session by operationally connecting, via the wireless network unit, the dental scanning system with one or more network elements.

20 Claims, 9 Drawing Sheets

(51) Int. Cl.
*G06T 7/00* (2017.01)
*G16H 30/20* (2018.01)
(58) Field of Classification Search
CPC ...... G06T 2207/30036; G01B 2210/58; G01B 11/25; H04W 48/00
See application file for complete search history.

(56) References Cited

U.S. PATENT DOCUMENTS

| | | | |
|---|---|---|---|
| 12,082,904 B2 * | 9/2024 | Saphier | G06T 17/20 |
| 12,138,013 B2 * | 11/2024 | Saphier | G06V 10/82 |
| 2012/0233679 A1 | 9/2012 | Shedrinsky | |
| 2015/0017598 A1 | 1/2015 | Wu et al. | |
| 2016/0259515 A1 | 9/2016 | Sabina et al. | |
| 2017/0142086 A1 | 5/2017 | Chen et al. | |
| 2018/0028064 A1 | 2/2018 | Elbaz et al. | |
| 2019/0269485 A1 * | 9/2019 | Elbaz | A61C 9/0053 |
| 2020/0320685 A1 | 10/2020 | Anssari Moin et al. | |
| 2021/0321872 A1 * | 10/2021 | Saphier | A61B 5/7475 |

* cited by examiner

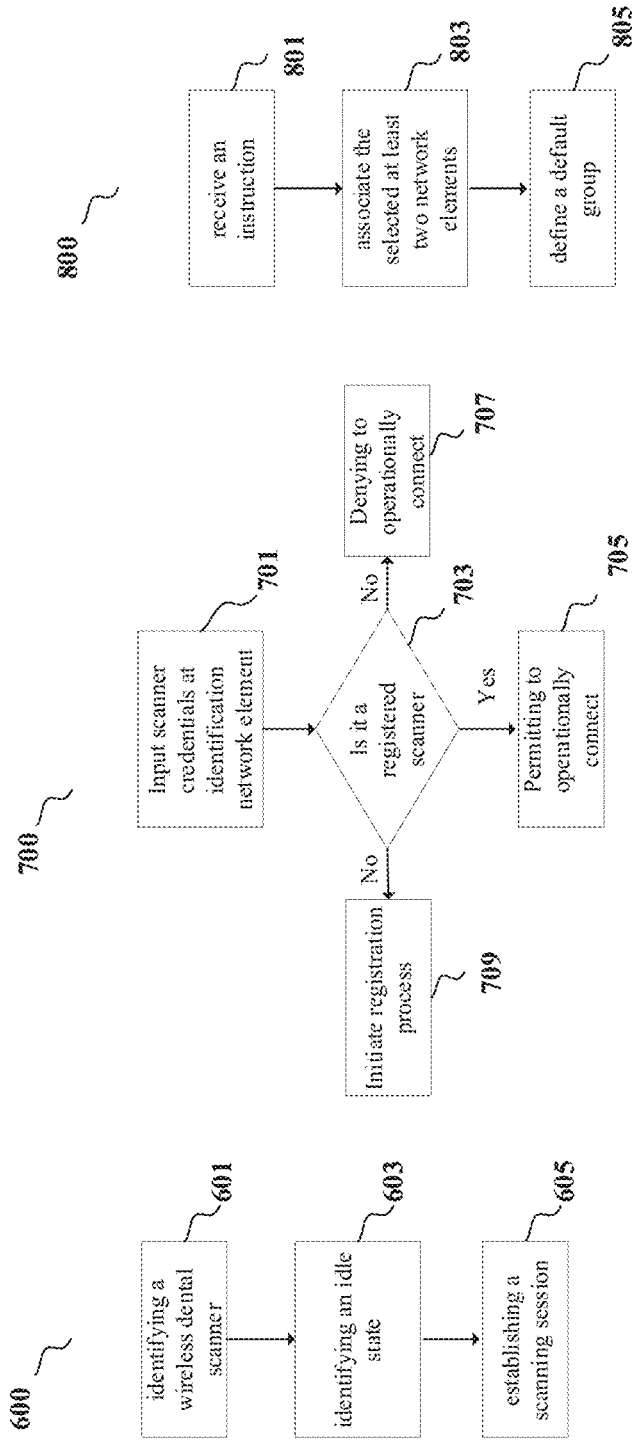

SYSTEM AND METHOD FOR SCANNING A DENTAL OBJECT

TECHNICAL FIELD

The disclosure relates to establishing a scanning session by operationally connecting a dental scanning system with one or more elements of a network. The dental scanning system is configured to acquire data from a three-dimensional dental object such as patient's intraoral cavity or plaster model of patient's teeth, during the scanning session.

BACKGROUND

Digital dentistry is increasingly popular and offers several advantages over non-digital techniques. Historically, digital advances had three foci: CAD/CAM systems, dental scanning systems, and practice/patient management systems. Dental scanning system such as intraoral scanners in combination with CAD/CAM systems even made possible delivery of same-day restorations. Practice/patient management software made possible capture of critical data such as patient information, and managing administrative tasks such as tracking billing, and generating reports. Such electronic patient records of patient-centered clinically-oriented information, motivated changes in tracking patients' health, facilitating quality of care assessments, diagnostics and mining data for research, including evaluation of efficiency and efficacy of clinical procedures.

Digital dental scanning systems, both intraoral and laboratory-based, are playing an important role in transforming both restorative and orthodontic dentistry. Real-time imaging using the scanning systems allows for creating three-dimensional digital model of single or multiple teeth, whole arches which may include restorations or implants, opposition arches, occlusion, and surrounding soft tissue or even dentures for edentulous patients. With on-screen display of the three-dimensional digital model, explaining treatment opportunities to patients is simplified. Patients appreciate the more comfortable data-acquisition process. Similarly, dental professionals appreciate the ease and efficiency of using scanning systems. Furthermore, space- and cost-demanding plaster casts/models are replaced by easily archived digital files. Data can be replayed at any time for a host of different reasons. CAD/CAM systems are designed to utilize the three-dimensional digital model of patient's teeth to design and fabricate dental restorations and orthodontic appliances ranging from simple inlays to digitally designed and fabricated full dentures, clear aligners, study models, implant-related components, both simple and complex surgical guides.

In order to obtain advantages of digital dentistry, different elements such as display, dental scanners, processing units, 3D printers, and other components are operationally connected to one another. These elements are conventionally connected in a fixed wired network whereby the ability of quickly rearranging elements or part of the network in a new configuration is hampered. Even if some elements in the network are wirelessly connected in a hybrid network comprising a combination of wired and wireless connections, such connection lacks the flexibility of dynamically creating connections between the network elements. Such lack of flexibility of allowing a network element to connect or disconnect with the network without a need to change wired connection of the element with the network leads to sub-optimal utilization of resources available in the network, thus affecting the efficiency and adaptability of a dental clinic or dental lab to changing demand.

It is desirable that the network elements such as dental scanning system that are part of the network in the dental clinic or dental lab may seamlessly and quickly connect with different network elements on the network. It may also make the network flexible if the same network element such as the dental scanner may be used at different service points such as different dental scanning stations such as in different rooms or scanning stations in a large clinic.

SUMMARY

By way of an example, a dental scanning system (a network element) that is configured to provide a service, i.e. scanning of a dental object is disclosed. The skilled person would recognize that the following disclosure is equally applicable for another network element that is configured to provide another service in the network. For example, the service that a remote processing unit may provide is to process data to generate an output based on such processing, or the service that a display unit may provide is to display an incoming data such as three dimensional representation of a dental object, etc. Therefore, in other embodiments, another network element is configured to provide another service in the network. The another network element may include an i) integrated one or more of wireless network unit, session module or discovery module, and/or ii) detachably connected other of the one or more of wireless network unit, session module or discovery module. The session module is configured to establish a service session by operationally connecting, via the wireless network unit, the another network element with one or more network elements. The discovery module is configured to transmit its element identifier (analogous to the scanner identifier) to the network. The details of the wireless network unit, session module, discovery module and other aspects is disclosed later in relation to a specific network element, i.e. dental scanning system.

According to an embodiment, a dental scanning system for acquiring data from a three-dimensional dental object during a scanning session is disclosed. The dental scanning system includes an illumination unit comprising a light source configured to illuminate the dental object;

a detector unit comprising a sensor configured to receive a plurality of two-dimensional images in response to the illumination of the dental object;

a processor configured to generate processed data during a scanning session by processing one or more of the plurality of two-dimensional images, wherein a three-dimensional digital representation of the dental object is generated based on the processed data; and a network unit configured to connect the dental scanning system to a network comprising a plurality of network elements including at least one network element configured to receive the processed data.

In the embodiment of the preceding paragraph, the network unit may include a wireless network unit or a wired network unit. The wireless network unit is configured to wirelessly connect the dental scanning system to the network comprising the plurality of network elements including the at least one network element configured to receive the processed data. The wired network unit is configured to establish a wired connection between the dental scanning system and the network comprising the plurality of network elements including the at least one network element configured to receive the processed data.

According to an embodiment, a dental scanning system for acquiring data from a three-dimensional dental object during a scanning session is disclosed. The dental scanning system includes
- an illumination unit comprising a light source configured to illuminate the dental object;
- a detector unit comprising a sensor configured to receive a plurality of two-dimensional images in response to the illumination of the dental object;
- a processor configured to generate processed data by processing one or more of the plurality of two-dimensional images, wherein a three-dimensional digital representation of the dental object is generated based on the processed data;
- a wireless network unit configured to wirelessly connect the dental scanning system to a network comprising a plurality of network elements including at least one network element configured to receive the processed data; and
- a network operation module comprising a session module configured to establish the scanning session by operationally connecting, via the wireless network unit, the dental scanning system with one or more network elements.

The scanning may be performed by a dental scanning system that may include an intraoral scanner such as TRIOS series scanners from 3Shape A/S or a laboratory-based scanner such as E-series scanners from 3 Shape A/S. The dental scanning system includes wireless capability as provided by the wireless network unit. This may be achieved by an in-built capability or by way of a connection with at least one wireless unit. The dental scanning system may employ a scanning principle such as triangulation-based scanning, confocal scanning, focus scanning, etc. In an embodiment, the scanning system is operated by translating a focus plane along an optical axis of the scanning system and capturing the plurality of 2D images at different focus plane positions such that each series of captured 2D images corresponding to each focus plane forms a stack of 2D images. In other words, the focus plane position is preferably shifted along the optical axis of the scanning system, such that 2D images captured at a number of focus plane positions along the optical axis forms said stack of 2D images (sub-scan) for a given view of the object, i.e. for a given arrangement of the scanning system relative to the object. After changing the arrangement of the scanning system relative to the object a new stack of 2D images for that view may be captured. The focus plane position may be varied by means of at least one focus element, e.g., a moving focus lens. The 3D scanner is generally moved and angled such that at least some sets of sub-scans overlap at least partially, in order to enable stitching. The result of stitching is the digital 3D representation of a surface larger than that which can be captured by a single sub-scan, i.e. which is larger than the field of view of the 3D scanner. Stitching, also known as registration, works by identifying overlapping regions of 3D surface in various sub-scans and transforming sub-scans to a common coordinate system such that the overlapping regions match, finally yielding the overall scan. The Iterative Closest Point (ICP) algorithm is widely used for this purpose.

The scanning session includes at least a time period during which data such as depth data and/or color data from the three-dimensional dental object, usually directly from the patient's oral cavity, is acquired using the dental scanning system. The scanning session generally relates to a single patient visit at a dentist/clinic/a scanning location. In other words, the scanning session may include the time period during which data such as depth data and/or color data from the dental object, usually directly from the patient's oral cavity, is acquired in the same patient's visit, i.e. uninterrupted by different patient's visits.

Network elements may include different components that are configured to be connected in a network and offer services in context of dentistry such a dental scanning, displaying a virtual dental object, manipulation of the three-dimensional dental model obtained via scanning, processing the data related to scanning or manipulation, etc. The network elements may thus include a hardware component offering one or more services on the network. It is to be noted that a single network element may be capable of offering multiple services such as a remote processing unit may generate the 3D representation based on the processed data and may also run a CAD software that is configured to facilitate designing components for restorative and orthodontic treatment. The network element may include display, dental scanners, processing units, 3D printers, X-ray apparatus and other components that are configured to be operationally connected to one another. The term "operationally connected" refers to a connection between at least two network elements such that the at least two network elements are in a ready-state to render their respective services to one another. Such ready state is achieved after negotiation between respective session modules of the at least two network elements.

The three-dimensional dental object may include a physical model including any of a gypsum/plaster model representing patient's teeth, a physical dental impression or patient's oral cavity comprising patient's teeth, gingival tissue, or any other material like restoration, implant, etc. The acquired data includes information relating to the three-dimensional dental object. This may include 2D images, depth data and may additionally include at least one of a color data or a data that is obtainable from the depth data and/or color data.

The light source that is configured to illuminate the dental object may be configured to generate a light of a single wavelength or a combination of wavelengths (mono- or polychromatic). The combination of wavelength may be produced by using a light source configured to produce a light (such as white light) comprising different wavelengths or the light source comprises multiple light sources such as LEDs individually producing light of different wavelengths that may be combined to form a light comprising the different wavelengths. Thus, this light produced by the light source may be defined by a wavelength defining a specific color, or a range of different wavelengths defining a combination of colors such as white light. In an embodiment, the light from the light source is capable of exciting fluorescent material of the tooth to obtain fluorescence data from the dental object, such a light source may be configured to produce a narrow range of wavelengths. In another embodiment, the light from the light source is Infra-Red light. Furthermore, the light illuminating the dental object may include a structured light comprising projected light patterns. The dental scanning system may include a spatial pattern such as a checkerboard pattern. The light may be passed through the spatial pattern to generate the projected light patterns.

In order to illuminate the dental object, the light source is directed from the light source towards the three-dimensional dental object. This is achieved by relative arrangement of the light source in the dental scanning system with respect to light directing optical components of the scanning system, and position of the light exit area in scanner tip of the scanning system relative to the dental object during the scanning session.

The light reflected from the dental object in response to the illumination of the dental object is directed, using optical components of the scanning system, towards the detector unit comprising the sensor. The sensor is an image sensor that is configured to generate a plurality of images based on the incoming light received from the illuminated dental object. The image sensor may also include color filter array such as a Bayer filter and/or additional filters that may be configured to at least substantially remove one or more color components from the reflected light and retaining only the other non-removed components prior to conversion reflected light into the electrical signal. For example, such additional filters may be used to remove a certain part of the light spectrum, such blue component and retaining only the Red and Green components from a signal generated in response to exciting fluorescent material of the tooth.

The processor is configured to generate a processed data by processing one or more of the plurality of two-dimensional images. The processor is configured to generate the processed data by processing one or more of the plurality of two-dimensional images such that the processed data is suitable for wireless transmission using the wireless network unit. This may include at least one of filtering, compressing, encrypting, or encoding the information available in the one or more of the plurality of two-dimensional images, and output of such processing represents the processed data.

In several embodiments, as described in following paragraphs, the processor may be configured to perform additional processing of the one or more of the plurality of two-dimensional images. The processed data may include information relating to depth data representing surface topology of the three-dimensional dental object, and may additionally include information relating to color data representing color of the three-dimensional dental object. The skilled person would appreciate that the below disclosed embodiments may be performed separately or in combination. Furthermore, one or more of the below disclosed embodiments that the processor does not perform or is not configured to perform, may be performed by a remote processing unit external to the scanning system.

The skilled person would recognize that the tasks allocated for the processor of the scanning system and the remote processing unit may be made in order to achieve a balance between speed, accuracy, and convenience. Thus, it is apparent that the definition of the processed data that the processor generates varies based on the embodiment(s) that the processor is configured to perform. The dental scanning system is configured to wirelessly transmit the processed data to the remote processing unit, which is configured to generate the three dimensional representation of the dental object based on the received processed data.

In one embodiment, the processing of the one or more of the plurality of two-dimensional images may include determining intensity value associated with the reflected light as detected at pixel(s) of the image sensor. The intensity value may be determined for an individual pixel of the sensor, or for a pixel block comprising more than one pixel (adjacent or non-adjacent), for example a single intensity value for a block of 8×8 pixel block. In another embodiment, the processing of the one or more of the plurality of two-dimensional images may include determining a correlation measure between a portion of one or more 2D image recorded by the pixel block and a weight function, wherein the weight function is determined based on information of the configuration of the spatial pattern. The correlation measure may typically be determined by a dot product computed for each of a plurality of said focus plane positions. Use of the correlation measure to generate a digital three-dimensional dental model is further disclosed in US Application No. U.S. Ser. No. 13/376,427 and U.S. Ser. No. 15/886,416, which are incorporated herein by reference. In either embodiments, i.e. single pixel or pixel block, the processor may be configured to determine the intensity value or correlation measure for all pixels or a selection of pixels of the image sensor.

In an embodiment, the processor may also be configured to identify a pixel or pixel block representing the maximum intensity value or correlation measure, and also an image corresponding to the identified pixel or pixel block. In an embodiment, the processor may be further configured to identify a position along an optical axis at which the corresponding correlation measure or corresponding intensity has a maximum value. The position along the optical axis may also be represented by a timestamp at which an image corresponding to the identified position was recorded at the image sensor. In an embodiment, the processor may also determine a surface color information corresponding to the pixel or pixel block of the one or more of the 2D images of the plurality of 2D where the correlation measure or the intensity has its maximum value for the. This allows to obtain both surface color information from the same plurality of images that provide the depth data. The surface color information may alternatively be obtained separately and later the processor may be configured to associate the surface color data with the depth data.

In an embodiment, the processor of the scanning system is configured to generate the three-dimensional digital representation of the dental object. Alternatively, as disclosed earlier, the processor of the scanning system is configured to generate the processed data, which is transmitted to the remote processing unit. The remote processing unit is configured to generate, based on the received processed data, the three-dimensional digital representation of the dental object. Irrespective of the use of processor or remote processing unit; in an embodiment, the generation of the three-dimensional model may rely on utilizing the information about the pixels or pixel blocks representing the maximum intensity value or correlation measure, the image(s) corresponding to the identified pixels or pixel blocks, position along the optical axis/timestamp corresponding to the image(s), and preferably the surface color information. The information is utilized to generate a point clouds, which are stitched and may eventually be converted to polygon mesh such as triangular mesh to yield the three-dimensional digital representation of the surface topography with or without color information for the scanned dental object. The stitching typically utilizes best-fit alignment techniques such as Iterative Closest Point algorithm, which aims at minimizing a difference between two clouds of points. ICP may be used to reconstruct 2D or 3D surfaces from different scans or sub-scans, as disclosed above. The algorithm is conceptually simple and is commonly used in real-time. The algorithm iteratively revises the transformation, i.e. translation and rotation, needed to minimize the distance between the points of two raw scans or sub-scans. The algorithm typically includes:

associating points by the nearest neighbor criteria.
estimating transformation parameters using a mean square cost function.
transforming the points using the estimated parameters.

iterating, i.e. re-associate the points and so on until a termination criteria is met.

The wireless network unit is configured to wirelessly connect the dental scanning system to the network. The wireless network unit such as a wifi module may typically include a chip that perform various functions required for the dental scanning system to wirelessly communicate with the network, i.e. with network elements that include wireless capability. The wireless network unit typically utilizes one or more of the IEEE 802.11 "WiFi" protocols/integrated TCP/IP protocol stack that allows the processor to access the network. The wireless network unit may include a system-on-chip having different types of inbuilt network connectivity technologies. These may include commonly used wireless protocols such as Bluetooth, ZigBee, Wi-Fi, etc.

The network may generally refer to interconnection of the plurality of network elements connected using multiple paths for the purpose of sending/receiving data. This data transmission among the network elements is over data links consisting of physical cable media and/or by wireless methods. However, the dental scanning system is configured to communicate, using the wireless network unit, with at least network element using the wireless method. Such network may include any of Personal Area Network (PAN), Local Area Network (LAN), Wireless LAN, Wide Area Network (WAN), or other network types. One of more network element may have access to the internet and network elements may also include a server such as a cloud server. The network elements may include a plurality of components like printers, processing unit, display, modems, routers, servers, storage, identification network element, etc. As disclosed earlier, these network elements may be connected using one or more of wires, optical fibers or wirelessly, so that at least some of these elements may communicate with one another and directly or indirectly with the dental scanning system that is configured to wirelessly connect in the network.

The network operation module includes the session module that is configured to establish the scanning session by operationally connecting, via the wireless network unit, the dental scanning system with one or more network elements. In order to establish the scanning session, the session module is configured to interchange information required to establish the session between the dental scanning system and the one or more network elements. This may include the session module transmitting a request for data from another network element. The data may include application-dependent information necessary for the connection to be established with another network element, such as encryption keys, IP addresses or opened User Datagram Protocol (UDP) Ports. The application running on the session module may determine if the data received in response to the request is sufficient to initiate a session. Apart from establishing the session, the session module may also be configured for managing and terminating the scanning session. Furthermore, the session module may be configured to add synchronization points into the data. These synchronization points allow identification of error so that the data may be re-synchronized, and ends of the messages are not cut prematurely and data loss is avoided. The session module may further be configured to act as a dialog controller, i.e. allowing the dental scanning system to communicate in half-duplex or full-duplex mode.

In an embodiment, the session module is configured to establish the scanning session in response to a trigger event that initiates a request for the scanning session. The session module, for the initiation, is configured to transmit a request for data from another network element. The data may include application-dependent information necessary for the connection to be established with another network element, such as encryption keys, IP addresses or opened UDP Ports. The trigger event may include transferring such as receiving a scanner credential associated with the scanning system at the identification network element comprised in the network. The scanner credential includes information that uniquely identifies the dental scanning system in response to the receipt of the scanner credential at the identification network element. A processing unit, external to the dental scanning system, comprised in the network may be configured to receive the scanner credential from the identification network element. An integral processor of the identification network element and/or the external processing unit is configured to process the received scanner credential to identify the scanning system. Such identification may include at least to determine whether the dental scanning system is a scanning system already registered in the network or registered to operate in the conjunction with the identification network element receiving the scanner credential. Additionally, the identification may also include determining level of access of the scanning system (e.g. for an already registered scanning system) to other network elements such as default group (discussed later), etc. In an embodiment, the identification network unit or the processing unit, external to the dental scanning system, is configured to determine, in response to an input at an identification network element, whether the wireless dental scanning system is registered with the network. When the dental scanning system is determined to be a registered dental scanning system, the identification network unit or the processing unit is configured to permit the wireless dental scanning system to operationally connect to one or more network element of the plurality of network elements to establish the scanning session. Alternatively, when the dental scanning system is determined to be an unregistered dental scanning system, the identification network unit or the processing unit is configured to deny the wireless dental scanning system to operationally connect to the one or more network element of the plurality of network elements or initiate a device registration process. The device registration process is defined as a process of registering an unregistered network such as an unregistered dental scanning system element into the network, and may be implemented using conventionally known techniques. As an example of registration process for bringing the network element (e.g. scanning system) on the network for the first time, network credentials are transferred to the network element such as the scanning system. This may include, but not limited to establishing a connection using legacy method(s) and transferring the network credentials using Wi-Fi Direct between two network elements to transfer the network credentials. The two network elements include a first network element that is getting registered to the network and a second network element comprising the a reader device such as an NFC reader device. In particular, if the second network element includes a WiFi functionality, then it would be sufficient to transfer credentials from the second network element to the first network element by simply touching/bringing close to the NFC ready network element to the NFC device. For example, beeping the first network element on the WiFi enabled NFC reader would allow establishing a WiFi link between the network elements and transferring the credentials, thus allowing the first network element to be registered with the network.

The legacy method(s) referred in the preceding paragraph may include creating an access point with a predefined network element specific credential such as password and name (e.g. serial number). The network element may then be preconfigured such as at a distribution center including factory or sales point to allow the network element to connect to a network using the credential, e.g. a combination of the name and password. In an embodiment, where the access point is set up using the credentials on a network element (e.g. a computer) that is already in the network, then the preconfigured network element is capable of communicating with the network element where the credentials are set up. The communication may occur over a wired channel such as a plug-in cord connection or wireless channel such as Bluetooth connection, Wi-Fi Direct connection between the preconfigured network element and the network element where the credentials are set up. Other forms of communication channels based on Near Field Communication (NFC) or imaging a QR code may also be employed. The preconfigured network element is configured to receive the network credentials, over the communication channel, from the communicating network element that is set up with credentials, and the preconfigured network element can connect to the network using the network credentials.

In one embodiment, the scanner credential is a RadioFrequency ID (RFID) tag and the identification network element is RFID reader. In another embodiment, the scanner credential is a Near Field Communication (NFC) tag & QR code and the identification network element is an NFC/QR code reader. In another embodiment, the scanner credential is a manually readable code such as a serial number and the identification network element comprises a processing module that is in communication with a user interface where the code may be manually entered at the user interface. In yet another embodiment, the scanner credential may include a proximity tag and the identification network element is a proximity sensor, which is configured to read the information comprised in the scanner credential when the scanned code is an predetermined distance from the proximity sensor. It would be apparent to the skilled person that communication of the information comprised in the scanner credential to the identification network element may be achieved by other techniques such as Received Signal Strength based communication including Bluetooth or any other conventionally known technique like multidimensional bar code or matrix codes, etc. and such implementations within the scope of this disclosure.

The network operation module may include a discovery module that is configured to discover network elements on the network and/or make the dental scanning system discoverable on the network. In an embodiment, the network operation module includes the discovery module that is configured to transmit a scanner identifier associated with the dental scanning system to the network, i.e. to one or more network elements. The scanner identifier comprises information that enables discovery of the scanning system in the network. In an embodiment, the discovery module is configured to operate using a Domain Name System (DNS) protocol and DNS Service Discovery protocol. Thus, the discovery module is configured to operate in Multicast Domain Name System (mDNS) protocol or Unicast Domain Name System (uDNS) protocol. The use of the term multicast refers to transmission of the service identifier of the dental scanning system and/or receipt of service identifier of other network elements where such transmission/receipt is made to or from all the other network elements or to some but not all the other network elements respectively. In another embodiment, the discovery module may be configured using a custom protocol operated in a unicast or multicast-based system. Such custom protocol approach may be preferred for reasons such as for handling naming conflicts of network devices and for performing discovery of network devices and identifying IP addresses of the network devices in a single/same step such as by utilizing custom Record comprising multiple characterizing aspects. For example, naming identifying a specific device on the network may be customized such that each network device is unique based on device unique serial number. Additionally or alternatively, unlike conventional DNS protocol requiring multi-step process to communicate different characterizing aspects, custom protocol transmits a data packet (e.g. custom Record, as described earlier) that may contain multiple characterizing aspects (e.g. device unique serial number and IP address of the network device) during the initial discovery, thereby allowing for a more efficient process. The skilled person would appreciate that the custom protocol may still operate with operational principle relating to the (uni- or multi-)cast DNS, however with an exception that earlier described custom Record during discovery phase is used. In yet another embodiment, the discovery module may be configured using a centralized signaling server, for example as known from WebRTC if broadcasting by several devices on the network may be prohibited.

In context of the disclosure, the term Unicast Domain Name System (uDNS) is to be understood as Domain Name System with a centralized server (e.g. a cloud server or a central server in local network), as opposed to a multicast Domain Name System (mDNS) where a distributed approach is used.

For the purpose of discovery, the discovery module may be configured to utilize Record such as DNS Record comprising Service Record (SRV Record) and/or Text Record (TXT Record) or custom Record that characterizes the service. The characterization of the service in the custom Record is based on one or more, normally more than one, characterizing aspect such as IP addresses, device identifier i.e. unique name of the network element, operational status, Time-to-Live, service offered by the network element such as scanning/display etc. The custom Record includes characterizing aspects packaged as a single data packet. Because the custom Record may include multiple characterizing aspects in a single data packet needed to access service, the custom Record allows for a more efficient communication (e.g. reduced latency and less likelihood of loss of relevant information data) by way of reducing the number of steps needed to access the service. In an embodiment, the scanner identifier comprises at least one of a device identifier, a service identifier or a domain identifier. The device identifier uniquely identifies a specific dental scanning system. Such identification typically relates to determining a unique device. The service identifier defines a service (e.g. scanning or other functionality) offered by the dental scanning system. The domain identifier defines location of the dental scanning system in the network. The DNS SRV Record is a specification of data in the DNS defining the scanner identifier, for example in the form of "<Device>.<Service>.<Domain>". For the scanning system, the service identifier defines scanning capability or any other functionality that the scanning system is configured to provide in the network, e.g. to other network elements. The domain identifier typically defines the target hostname and port where the service at the scanning system may be accessed. This may be exemplified with the following example. The SRV record may define that the scanner.tcp.local is available at my-pc.local on port 5000. Then, my-pc.local (using DNS A records) may be looked up to determine that my-pc.local may be found at 192.168.1.54. These information in combination defines that the scanner.tcp.local service may be reached at 192.168.1.54:5000. The DNS TXT record gives additional information about the scanning system defined by the DNS SRV Record. This may include text with the scanning system, such as human readable information or a machine-readable data.

In an embodiment, the dental scanning system is a handheld scanning device, which may be a wireless intraoral scanner. In another embodiment, the dental scanning system includes a handheld scanning device such as a scanner wand in a wired connection with at least one wireless unit. The at least one wireless unit includes one or more of the wireless network unit, the discovery module or the session module. The at least one wireless unit is external to the handheld scanning device, which may be an intraoral scanner. The wireless network unit is configured to wirelessly connect the handheld scanning device to the one or more network element, the discovery module configured to transmit the scanner identifier associated with the handheld scanning device to the network, and the session module configured to establish the scanning session by operationally connecting, via the wireless network unit, the handheld scanning device with the one or more network elements. Depending upon the elements that are comprised in the at least one wireless unit, the handheld scanning device comprises other of the one or more of the wireless network unit, discovery module or session module. In other words, the handheld scanning device in combination with the at least one wireless unit includes the wireless network unit, session module and session module.

In an embodiment, the discovery module is configured to transmit an operational state relating to the dental scanning system to the at least one or more network elements. In an embodiment, the term "relating to" may refer to operational state of the service that the network element (e.g. scanning system) is configured to provide. For example, a network element configured to provide a plurality of services may transmit a plurality of operational states corresponding each of the plurality of services based on whether the each of the plurality of services is an idle of non-idle state. In another embodiment, the term "relating to" may refer to operational state of the network element (e.g. scanning system). For example, a network element configured to provide a plurality of services may transmit a single operational state comprising i) a non-idle state if at least one service from the plurality of services satisfies the condition of the non-idle state, or ii) an idle state if all services from the plurality of services satisfies the condition of the idle state. The transmission of the operational state may be made to other elements of the network as in multicasting or to a server (such as a cloud server) as in unicasting. As indicated earlier, the operational state includes at least one of an idle state or a non-idle state. The idle state is defined by an available state, which is defined by the dental scanning system in a switched-ON mode and not in operational connection with any other network element. In the available state, a network element such as a dental scanning system is available for operationally connectivity with other network elements. The non-idle state is defined by an unavailable state, which is defined by the dental scanning element in a switched OFF mode or a switched-ON mode non-idle state comprising the dental scanning system being in a switched-ON mode and in operational connection with any other network element, e.g. when the dental scanning system is in the scanning session.

In the available state, a network element such as the dental scanning system is available for operationally connectivity with other network elements.

The session module, in response to the input of the scanner credential at the identification network unit, may be configured to operationally connect the dental scanning system with the one or more network elements. In one embodiment, the one or more network elements includes a default group of network element comprising the one or more network elements associated with the dental scanning system and/or associated with the identification network element. The default group may also be created for a specific location such as a room in a dental clinic, or specific user of the dental scanning system, etc. Additional network elements may be added, or the existing network elements may be removed from the default group through user input at a user interface. The default group may be created by associating different network elements to a group. Such association may be made either manually or automatically such as by identifying the location, for example location defined in the domain identifier or proximity detection among the network elements. In response the identification network unit receiving the scanner credential, the network elements in the default group are operationally connected. This is particularly useful because with only one trigger event, the scanning session may be established. The operational connectivity between the dental scanning system and network elements in the default group may be established if the network elements are in idle state. However, in an embodiment, the dental scanning system is configured to establish operational connection with a network element of the default group even when the network element is in the switched-ON mode non-idle state (discussed below). The default group is generally static and is typically changed through creation and storing of a new default group by association or disassociation of specific network element from the default group. The default or new default group is configured to be used in multiple scanning sessions for same patient or different patients. Additionally or alternatively, in other embodiments, the one or more network elements include a customized group comprising a group based on a manual selection of the one or more network elements from a selection pool comprising at least the one or more network elements as selectable entries. The selectable entries may only list network elements that are operating in the idle state. The customized group is generally created immediately prior to initiating establishing the scanning session. The customized group is generally used for a single scanning session. However, the customized group, listing network elements that are configured to operationally interconnect to establish the scanning session, may be saved in which case the saved customized group may be considered as a default group that is configured to be used for multiple scanning sessions. However, in an embodiment, a network element such as the dental scanning system is configured to establish connection with a network element that is in the switched-ON mode non-idle state (discussed below). This allows for creating a customized group for a scanning session.

Whereas a simple scenario comprises establishing an operational connection between the scanning system and a network element such as a remote processing unit, the concept of grouping may allow multiple connections to be established between different services, for example during the scanning session. This may allow the operational connection between the scanning system and a network element unit to be understood in a broader context, i.e. to include the intent of the user to scan the dental object, rather than simply to pair the scanning system and the network element. As part of this intent, the dentist may desire to establish a first operational connection between the scanning system and a remote processing unit, external to the scanning system, to generate the 3D representation of the dental object based on the processed data establish a second operational connection between the remote processing unit and a first monitor facing the patient to show a simplified view with only the patient-relevant data on the first monitor, establish a third operational connection between the remote processing unit and a second monitor facing the dentist to show an interactive view of the generated 3D representation on the second monitor, setup software to be in a state where scanning is possible, and advertise that the scanning system is in use The identification network element may be configured to establish operational connection between at least two network elements of the default group associated with the identification network element and the scanning system when the trigger event occurs. In response to the trigger event, the identification network element may be configured to initiate operational connection between the at least two network elements of the default group associated with the identification network element, for example by instructing individual session modules of the at least two network elements of the default group to establish the operational connection between each other, and may further act as a proxy-negotiator with the scanning system on behalf of the default group, i.e. the session module of the identification network element communicates with the session module of the scanning system to operationally connect the scanning system with the network elements of the default group, thereby establishing the scanning session. Such communication may require the session module of the identification network element exchanging application dependent information for establishing the scanning session. In another embodiment, the same principle may be applied for a user defined customized group, whereby the identification network element may instruct respective session modules of the network elements in the user defined (typically customized) group to establish operational connection among one another and may further act as a proxy negotiator with the scanning system on behalf of the user defined group, i.e. session module of the identification network element communicates with the session module of the scanning system to operationally connect the scanning system with the network elements of the user defined group, thereby establishing the scanning session. Such communication may require the session module of the identification network element exchanging application dependent information for establishing the scanning session.

A network element such as the dental scanning system through its session module may be configured to establish a connection with a network element operating in an idle state or a switched-ON mode non-idle state. In an embodiment, the connection between the dental scanning system and the one or more network elements operating in the switched-ON mode non-idle state is dependent upon hierarchy of the dental scanning system relative to the other network elements in the network. The relative hierarchy ranks network elements, such as the dental scanning system, in the network with respect to one another. The hierarchy may be defined manually for each network element or may be defined based on the service (e.g. as defined by the service identifier) offered by the network element. For example, a dental scanning system may be ranked higher than a remote processing unit. Such ranking defines that a service requesting network element is configured to access the services offered by a service-providing network element even if the service-providing network element is in an operational connection with other network elements provided that the service requesting network element is ranked higher than the service providing network element. In another embodiment, the connection between the dental scanning system and the one or more network elements operating in the switched-ON mode non-idle state is dependent upon access rights assigned to the service requesting network element such as the dental scanning system. Such access right may include right to override an existing operational connection of the service providing network element with other network elements. The service requesting network element is configured to access the services offered by a service-providing network element even if the service-providing network element is in an operational connection with other network elements provided that the service requesting network element is assigned the access right. In either embodiment, the service requesting network element and the service providing network element typically belong to different service category, which may be defined by the service identifier or through other ways. For example, intraoral dental scanning systems are network elements of same type, displays are network elements of same type, etc. Other ways of implementing a connection of the session module with a network element operating in an idle state or a switched-ON mode non-idle state is also possible and within the scope of this disclosure.

In an embodiment, the discovery module is configured to receive operational state of at least the one or more network elements. In a multicast scenario, operational state is received individually from network elements in the network. In a unicast scenario, operational state regarding different elements in the network is received from a centralized server such as a cloud server that is configured to receive operation individually from network elements and maintain details regarding the network elements and received operational state for the network elements.

In an embodiment, the discovery module of the dental scanning system is configured to receive element identifier associated with the network elements. An element identifier associated individually with different network elements includes information that enables discovery of a network element in the network. Discovery elements of the plurality of network elements network are configured to operate using a Domain Name System (DNS) protocol and DNS Service Discovery protocol. Thus, the discovery modules of the network elements are configured to operate in Multicast Domain Name System (mDNS) protocol or Unicast Domain Name System (uDNS) protocol. The use of the term multicast refers to transmission of the service identifier of the dental scanning system and/or receipt of service identifier of other network elements where such transmission/receipt is made to or from all the other network elements or to some but not all the other network elements respectively. For the purpose of discovery, the discovery module associated with the network elements may be configured to utilize DNS Record comprising Service Record (SRV Record) and/or Text Record (TXT Record). In an embodiment, the element identifier comprises at least one of a device identifier, a service identifier or a domain identifier. The device identifier uniquely identifies a specific network element. Such identification typically relates to determining a unique network element. The service identifier defines a service (e.g. display or processing or printing, etc.) offered by the network element. The domain identifier defines location of the network element in the network. The DNS SRV Record is a specification of data in the DNS defining the element identifier, for example in the form of "<Device>.<Service>.<Domain>".

Utilizing the received operational state of at least the one or more network elements and the received element identifier, the network operation module of the scanning system may establish operation connection with the one or more network element.

In an embodiment, the dental scanning system includes a memory that includes record of at least the one or more network elements along with operational state of at least the one or more network elements. Additionally, the record may also include individual element identifier associated with the at least one or more network elements. The session module may be configured to access the record from the memory of the dental scanning system and establish the connection between the dental scanning system with the one or more network elements based on at least the operational state (such as idle state or a switched-ON mode non-idle state) of the at least one or more network elements.

In an embodiment, the discovery module is configured to send, typically prior to establishing the scanning session such as prior to accessing the record comprising a locally stored record, a query to the network such as to at least the one or more network elements; and update the record based on a response received for the query. The response includes operational state of the at least one or more network element and may also include element identifier of the at least one or more network element. The session module is configured to establish the connection between the dental scanning system and the one or more network elements based on the updated record. The updated record may include at least the operational state of at least the one or more network elements.

In an embodiment, the discovery module is configured to send, typically prior to establishing the scanning session such as prior to accessing the record, a query to the network. The query may be sent to at least one or more network elements in the network, the at least one or more network elements being configured to at least transmit respective operational state in response to the query. In response to the query, the at least one or more network elements may also transmit their respective element identifier. Additionally or alternatively, the query may be sent to a server such as a cloud server that is configured to receive operational state individually from at least one or more network elements and maintain details regarding the at least one or more network elements and received operational state for the at least one or more network elements. The server may also be configured to receive and maintain individual element identifier associated with the at least or more network elements. The server is configured to transmit the maintained operational state in response to the query. In response to the query, the server may also be may also be configured transmit the maintained individual element identifier. In one embodiment, the server may be configured to transmit operational details with or without element identifier for only those network elements that are in idle state. Irrespective of whether the response is received from the network elements or a specific network element (e.g. a server), the discover module may further configured to update a record comprising a locally stored record at the scanning system based on a response received for the query or to create a local record. The session module is configured to establish the connection between the dental scanning system with the one or more network elements based on the updated record or locally created record.

In another embodiment, the discovery module is configured to send a request, to a network element such as a server typically prior to establishing the scanning session such as prior to accessing the record, for transmission of a collective record of at least the one or more network elements and respective operational state. The collective record may also include element identifier associated with the at least one or more network elements. The collective record is maintained at the server. The discovery module is further configured to receive the collective record, wherein the session module is configured to establish the connection between the dental scanning system with the one or more network elements based on the received collective record.

In an embodiment, the discovery module is configured to transmit operational state of the dental scanning system at a regular interval of a first time period. Additionally or alternatively, the discovery module is also configured to receive operational state of the at least one or more network elements at a regular interval of a second time period, wherein the second time period is shorter than lifespan of the operational state in the record. The record is typically maintained locally (e.g. in a cache) at the dental scanning system. Typically, the first time period and the second time period are same but may be different. The lifespan is expressed as Time-to-Live (TTL), which corresponds to a validity period of the operational state in the record. TTL may be implemented as a counter, or timestamp attached to or embedded in the received operational state. The operational state in the record locally available at the scanning system is valid only until the expiry of lifespan. Therefore, in order to reliably use the operational state in the record for establishing operational connection, it is desirable that the operational state needs to be updated regularly, preferably prior to the expiry of the lifespan. Thus, network elements including the scanning system are configured to transmit to one or more network elements like server their operational state prior to expiry of the TTL. Additionally or alternatively, the discovery module may transmit a query and update the local record, as discussed earlier.

In a multicasting scenario in combination with short operational state update time-period may significantly increase traffic on the wireless network, especially in a network with a large number of network elements, because at least some of the network elements engage in group communication, i.e. are configured to transmit their respective operational state to other network elements in the wireless network. Thus, in one embodiment, the operation state update time-period may be increased for the multicasting scenario. Additionally or alternatively, the network elements may be operated in a unicasting scenario where the network elements transmit their respective operational state to a server. Even in the unicasting scenario, the time-period to update operation state at the server may be altered to identify a balance between bandwidth utilization and reliable use of the operational state. In an embodiment, a network element such as a scanner is configured to transmit an operational state in response to an activation event. The activation event may include a user input such as inserting a battery into a network element or removing a battery from the network element. The term inserting battery may include the process of inserting the battery into the battery slot of the network element but may also include the situation when the battery is completely inserted into the battery slot. The term removing the battery may include the process of removing the battery from the battery slot of the network element. In response to the activation event, the network element such as the scanner may transmit an update message relating to the operational state of the network element such as the scanner. The update message is used to update the operational state of the network element in the network, i.e. at other network elements and/or a server.

Additionally or alternatively, the activation event may include one or more of a user switching ON the network element, switching OFF the network element or the process of switching the state of the network element from ON state to an OFF state. The network element includes a power ON and OFF interface such as a button or touch sensitive element such as touchpad/touchscreen. In an embodiment, the network element includes a monitoring unit that is configured to monitor the state of the power interface, i.e. whether the user interaction with the power interface indicates any of the activation event. The monitor unit is communicatively connected to a signal unit, which as one example may include the discovery module. The monitoring unit may further be configured to control the power supply to at least the signal unit, preferably with other components of the network element such as components involved in the transmission of the operational state. In an embodiment, the monitor unit is configured to detect a switch ON event. In response to the detected switch ON event, the monitor unit is configured to instruct the signal unit to transmit an operational state such as idle state relating to the network element to the at least one or more network elements. In another embodiment, the monitor unit is configured to detect a switch OFF event, i.e. the network element is in OFF state. In response to the detected switch OFF event, the monitor unit is configured to instruct the signal unit to transmit an operational state such as non-idle state (e.g. power OFF mode) relating to the network element to the at least one or more network elements. To ensure that the transmission of the operation state is possible when the network element is in the switched OFF mode, the network element includes a charging circuit comprising an electrical energy storing element such as one or more capacitors. The electrical energy storing element is charged when the network element is in the switched-ON mode. To allow the transmission, the electrical energy storing element is configured to provide power to at least the signal unit, preferably with other components of the network element such as components involved in the transmission of the operational state when the network element is in the switched-OFF mode. This ensures that the signal unit and other components required to transmit the operational state has electrical power to operate. In yet another embodiment, the monitoring unit is configured to detect whether the power interface of the network element that is in an ON state is pressed or touched. The monitoring unit may be further configured to assess whether the press or touch meets a transmission criterion such as pressing of the button for more than a predetermined time-period (typically less the time needed to switch OFF the network element) or swipe in a certain direction on a touch sensitive pad. In response to the detection, the monitoring unit is configured to instruct the signal unit to transmit an operational state such as non-idle state (e.g. power OFF mode) relating to the network element to the at least one or more network elements. The monitoring unit is configured to determine whether transmission of the operational state is completed, and to instruct switching OFF of the network element when the determination is made that the transmission of the operational state is completed. This ensures that the signal unit and other components required to transmit the operational state has electrical power to operate. The disclosed embodiments are applicable to battery operated network elements (e.g. a scanning system) having the power interface. However, the embodiments are particularly useful for non-battery network elements, having the power interface, that are powered from non-battery power supply such as plug-socket based mains electricity.

The transmission of operational state is typically dependent upon Time-to-Live (TTL). Usual TTL of 120 seconds may be considered high for network elements that are routinely switched ON and OFF. It is possible to reduce the TTL to a smaller period but this may result in an increase in the communication on the network which is undesirable for bandwidth reasons. The presence of a method and system for transmitting operational state in response to activation events such as detecting removing the battery and/or based on switching the state of the network element offers the possibility of extending the TTL period, thereby improving network performance without sacrificing the reliability of the operational state.

In an embodiment, the session module is configured to send a request to the at least one or more network elements for establishing the connection between the dental scanning system and the one or more network elements. Alternatively, the session module may also receive a request from the at least one or more network elements such as from session modules of the network elements for establishing the connection between the dental scanning system and the one or more network elements. A response to the request for establishing the connection may include application-dependent information for establishing the connection, the application-dependent information comprising encryption keys, and IP addresses or opened User Datagram Protocol (UDP) Ports.

In light of the preceding paragraph; according to an embodiment, a session may be negotiated by receiving, from a request sending network element, a request to the session module running on the scanning system. The request typically contains the application-dependent information necessary for a connection to be established, such as encryption keys, necessary IP addresses or opened UDP Ports. The processor is configured to determine whether the contained information is sufficient to initiate a session. If yes, then the processor is configured to respond with necessary application-dependent information and a positive exclusive reply to the session request. If the application (run by the processor) supports, a positive non-exclusive reply may also be sent, which allows multiple session to be established with the scanning system and/or the request sending network element. The scanning system and/or the request sending network element may also be individually configured to deny requests for connection from other devices (network elements) if the scanning system and/or the request receiving network element are already in a session. In another embodiment, a session may be negotiated by sending a request from the session module running on the scanning system. The request typically contains the application-dependent information necessary for a connection to be established, such as encryption keys, necessary IP addresses or opened UDP Ports. If the application run by the processor of the request receiving network element determines that the contained information is sufficient to initiate a session, it responds with necessary application-dependent information and a positive exclusive reply to the session request. The session module of the scanning system is configured to receive the necessary application-dependent information, and a session may be established between the scanning system and the network element with which the application-dependent information is exchanged. If the application supports it, the scanning system and/or the request receiving network element may transmit a positive non-exclusive reply, thus allowing multiple sessions to be established with a single device (scanning system or request receiving network element). The scanning system and/or the request receiving network element may also be individually configured to deny requests for connection from other devices (network elements) if the scanning system and/or the request receiving network element are already in a session.

In an embodiment, the dental scanning system or a network element, connected in the scanning session, is configured to establish the operational connection (such as through the session module) with at least one additional network element outside the scanning session without interrupting operational connection among the one or more network elements already connected in the scanning session. Introduction of the at least one additional network element in an ongoing session relies at least on the operational state of the at least one additional network element and the element identifier (as discussed earlier). This allows for introducing more services in the ongoing scanning session. The additional network elements may include an additional display that is configured to display an output such as three-dimensional dental model, which is based on the processed data. In another embodiment, the session module is configured to disconnect the dental scanning system from the operationally connected one or more network elements without affecting the operational connection between the one or more network elements. This allows for the network elements to stay connected for post scanning tasks such as designing a restorative or orthodontic treatment plan on the generated three-dimensional dental model. Simultaneously, allowing the dental scanning system to be disconnected makes the dental scanning system available for establishing other scanning sessions.

In an embodiment, the dental scanning system includes a memory configured to retain session information associated with the scanning session when the handheld device from the scanning session changes its mode from ON to OFF during the scanning session. The session information may include the application-dependent information for re-establishing the operational connection with the at least one or more network elements, i.e. information that allows the dental scanning system to re-connect in the scanning session. The application-dependent information may include encryption keys, and IP addresses or opened User Datagram Protocol (UDP) Ports. In context of this embodiment, the phrase "during the scanning session" is defined as a period starting from establishing the scanning session to a timepoint where the session module of the scanning system initiates termination of the operational connection between the scanning system and operationally connected one or more network elements. The session module is further configured to reconnect, using the session information, the dental scanning system in the scanning session after the dental scanning system changes the mode from OFF to ON. This may be useful when a battery operating dental scanning system needs to change battery during the scanning session because the scanning system may automatically reconnect to the scanning session.

In an embodiment, the memory is configured to retain session information associated with the scanning session for a predefined time period. Accordingly, the session module may be configured to reconnect using the session information when the dental scanning system changes the mode from OFF to ON within the predefined time period.

In an embodiment, in response to the activation event such as removing the battery from the network element such as the scanner that is in operational connection during the scanning session, the network element is configured to transmit operational state of the network element with or without a validity period to maintain this transmitted operational state for a predefined time period. The term removing battery may include the process of removing the battery from the battery slot. This may be achieved by designing the network element such as the scanner such that the network element is configured to transmit its operational status during the battery removal process, i.e. prior to electrical disengagement of the battery. The maintenance of the transmitted operational state may be in local cache of other network elements (multicasting scenario) or at a server (unicasting scenario). The validity period relates to validity of the operational state transmitted during the battery removal process, and is typically more than the earlier disclosed first time period and second time period. Because the network element is in the scanning session, the operational state in this situation is a non-idle state. The validity period may be defined based on the task that needs to be performed during the predefined time period such as replacing a battery. For example, if the first time period or second time period is 20 seconds, the validity period may be around 120 seconds.

According to an embodiment, a dental scanning system for acquiring data from a three-dimensional dental object during a scanning session is disclosed. The dental scanning system comprises
    an illumination unit comprising a light source configured to illuminate the dental object;
    a detector unit comprising a sensor configured to receive a plurality of two-dimensional images in response to the illumination of the dental object;
    a processor configured to generate a processed data during a scanning session by processing one or more of the plurality of two-dimensional images, wherein a three-dimensional digital representation of the dental object is generated based on the processed data; and
    a charging circuit comprising an electrical energy storing element that is configured to be charged when the scanning system is in a switched-ON mode; and
    a discovery module that is configured draw electric power from the electrical energy storing element to transmit operational state of the scanning system.

The electrical energy storing element is configured to provide electric power to the discovery module to allow transmission of the operational state of the scanning system, when the scanning system in a switched-OFF mode or when the battery is removed from the scanning system, i.e. the battery is no longer providing power to the scanning system. The electrical energy storing element may be configured to provide electric power to other components of the scanning system involved in the transmission of the operational state. The system may further include a monitoring unit that is configured to detect whether the battery is removed, or the scanning system is in a switched-OFF mode. This may be implemented in several ways such as by measuring electrical properties such as current or voltage in a circuit in connection with the electrical terminals of a battery slot. In response to the detection that the battery is removed or the scanning system is in a switched-OFF mode, the monitoring unit is configured to instruct the discovery module to transmit an operational state such as non-idle state (e.g. power OFF mode) relating to the scanning system to the at least one or more network elements.

As disclosed in the preceding paragraph, the network element such as the scanner such that the network element is configured to transmit its operational status in response to removing the battery from the battery slot. The term removing battery may include the process of removing the battery from the battery slot. To this effect, a battery-operated wireless preferably handheld, dental scanning system is disclosed. According to an embodiment, a dental scanning system for acquiring data from a three-dimensional dental object during a scanning session is disclosed. The dental scanning system comprises an illumination unit comprising a light source configured to illuminate the dental object;
   a detector unit comprising a sensor configured to receive a plurality of two-dimensional images in response to the illumination of the dental object;
   a processor configured to generate a processed data during a scanning session by processing one or more of the plurality of two-dimensional images, wherein a three-dimensional digital representation of the dental object is generated based on the processed data; and
   a battery slot configured to receive a battery and comprising
      electrical terminals configured to establish an electrical connection with corresponding electrical terminals of the battery to power the scanning system, and
      an element in contact with a corresponding element of the battery such that a contact length between the elements in the direction of removing the battery from the battery slot is shorter than a contact length between the electrical terminals.

According to an embodiment, a system comprising the scanning system and a battery comprising the corresponding electrical terminal and element is disclosed.

The scanning system of may further include a wireless network unit configured to wirelessly connect the dental scanning system to a network comprising a plurality of network elements including at least one network element configured to receive the processed data. The scanning system may also include any of the features discussed in this disclosure.

The contact length in relation to the elements may be defined as the length along which the element and corresponding element maintains contact (such as electrical contact for electrical elements) during the battery removing process. The contact length in relation to the terminals may be defined as the length along which the electrical terminal and corresponding electrical terminal maintains electrical contact during the battery removing process.

In an embodiment, the positioning of the contact length corresponding to the elements in the direction of removing the battery is such that contact between the corresponding elements of the scanning system and battery is broken prior to breaking the contact between the corresponding electrical terminals of the scanning system and battery. Because of sequential disengagement of the corresponding elements prior to the corresponding electrical terminals during the battery removing process, the battery may provide power to the scanning system to send the operational state to the network before the battery is completely withdrawn.

The scanning system may include a detection module configured to detect loss of connection between the corresponding elements. The detection module may be configured to measure an electrical property, for example if the elements include electrical elements i.e. elements that are electrically connected in a measurement circuit, such that the measurement represents the contact or loss of contact between the corresponding elements of the scanning system and battery. In response to the measurement, i.e. detection of the loss of connection between the corresponding electrical terminals, the scanning system (e.g. discovery module) is configured to transmit operational state of the scanning system to the network, i.e. to other network elements and/or to a server. Such operational state may include a non-idle state if the battery is removed when the scanning system is already in a scanning session.

The element disclosed previously may include electrical element. In another embodiment, instead of having the elements as disclosed previously, the battery slot includes a module that is configured to engage with the battery when the battery is in position within the battery slot. The module may include a locking mechanism configured to lock the position of the battery within the battery slot. Such locking mechanism may include physical units in the battery slot and battery that are configured to interlock with each other such as force activated detachable hopf links. The physical units may include detachable magnetic locking comprising a magnet positioned in one of the battery slot or battery and another magnet or metal on other of the battery or battery slot such that when the battery is in position, the magnet and another magnet/metal are aligned and keeps the battery in position within the battery slot. The physical unit may include a form of contact sensor with a sensor positioned in the scanning system and the battery comprising a magnet of the contact sensor system.

With respect to the above embodiments, the scanning system may include a detection module configured to detect initiation of removing the battery from the battery slot. The detection module may be configured to detect unlocking of the physical lock, disengagement with the magnet, or loss of contact. In response to the detection, the scanning system (e.g. discovery module) is configured to transmit operational state of the scanning system to the network, i.e. to other network elements and/or to a server. Such operational state may include a non-idle state if the battery is removed when the scanning system is already in a scanning session.

According to an embodiment, a system for operationally connecting a dental scanning system with network elements comprised in a network is disclosed. The system includes
   a plurality of network elements (e.g. a dental scanning system) interconnected in a network, the network elements comprising at least a display unit, and processing unit, wherein
      at least one of the network elements of the plurality of network elements is configured to transmit its operational state comprising an idle state or non-idle state,
      the at least one of the network elements of the plurality of network elements, when in the idle state, is configured to be available for establishing an operational connection with at least one of other network elements,
      the at least one of the network elements of the plurality of network elements, when in the operational connection is configured to provide a dental service to the at least one of other network elements; and
   an identification network element, connected to the network, configured to identify a dental scanning system based on a scanner credential associated with the dental scanning system, wherein the dental scanning system comprises a session module configured to, in response to a trigger event, establish a scanning session by operationally connecting via a wireless network unit the dental scanning system wirelessly with one or more network elements.

The dental service may include, but not limited to, dental design functionality such as in CAD software for designing devices for restorative or orthodontic treatment, dental data input, or processing of dental data. These services may also include functionality provided by the CAD/CAM systems, dental scanning systems, and practice/patient management systems. These services may be defined in the service identifier associated with the at least one of the network elements.

According to an embodiment, a kit for establishing a network operationally connecting a dental scanning system with network elements comprised in a network is disclosed. The kit includes a plurality of network elements (e.g. a dental scanning system) configured to be interconnected in a network, the network elements comprising at least a display unit, and processing unit, wherein at least one of the network elements of the plurality of network elements is configured to transmit, when connected in the network, its operational state comprising an idle state or non-idle state, the at least one of the network elements of the plurality of network elements, when in the idle state, is configured to be available for establishing an operational connection with at least one of other network elements, the at least one of the network elements of the plurality of network elements, when in the operational connection is configured to provide a dental service to the at least one of other network elements; and an identification network element, configured to be connected to the network and when connected in the network, configured to identify a dental scanning system based on a scanner credential associated with the dental scanning system, wherein the dental scanning system comprises a session module configured to, in response to a trigger event, establish a scanning session by operationally connecting via a wireless network unit the dental scanning system wirelessly with one or more network elements.

The dental service may include, but not limited to, dental design functionality such as in CAD software for designing devices for restorative or orthodontic treatment, dental data input, or processing of dental data. These services may also include functionality provided by the CAD/CAM systems, dental scanning systems, and practice/patient management systems. These services may be defined in the service identifier associated with the at least one of the network elements.

According to an embodiment, a method for acquiring data from a three-dimensional dental object during a scanning session is disclosed. The method includes identifying a wireless dental scanning system by receiving a scanner credential associated with a dental scanning system at an identification network element;

identifying at least some of the network elements transmitting an idle state, the network elements being interconnected in a network and comprising at least two of the dental scanning system, display unit, or processing unit; and establishing a scanning session by operationally connecting the identified dental scanning system and a selection of one or more network elements from the at least some of the network elements transmitting the idle state.

According to an embodiment, a method for operationally connecting a wireless dental scanning system with one or more network elements comprised in a network is disclosed. The method includes determining, in response to an input at an identification network element, whether the wireless dental scanning system is registered with the network, the network comprising a plurality of network elements comprising at least a display unit, and a processing unit; and permitting the wireless dental scanning system to operationally connect to one or more network element of the plurality of network elements to establish a scanning session when the dental scanning system is determined to be a registered dental scanning system.

In an embodiment, when the dental scanning system is determined to be an unregistered dental scanning system, the method includes denying the wireless dental scanning system to operationally connect to the one or more network element of the plurality of network elements or initiate a device registration process. The device registration process is defined as a process of registering an unregistered network element such as an unregistered dental scanning system into the network, and may be implemented using conventionally known techniques.

According to an embodiment, a computer program product embodied in a non-transitory computer readable medium is disclosed. The computer program product includes computer readable program code when executed by a hardware data processor to cause the hardware data processor to receive an instruction to select at least two network elements from a list of plurality of the network elements, associate the selected at least two network elements to each other; and define a group comprising the associated at least two network elements.

In an embodiment, the data processor is configured to automatically associate the at least two network elements based on a defined criterion. The defined criterion may include location defined by domain identifier or physical location such as a specific scanning room in a clinic. Additionally or alternatively, the instruction may be received from a user, who may select the at least two network elements. The selection may be made from a list comprising network elements that are represented in specific categories, for example based on the services offered by the network element or location, etc such that network elements offering the same service or in same location are categorized in the same category. The user may then select one or more network elements from a specific category if the user intends to include, in the group, a network element offering a specific service. The term associate refers to linking the at least two network elements such that establishing a scanning session with one of the at least two network elements automatically brings the other network element of the at least two network elements into the scanning session. In different embodiments, the defined group is a customized group or a default group. The customized group is created each time for a scanning session whereas configuration of the network elements in the default group is stored and the default group may be used for multiple scanning sessions.

According to an embodiment, a computer program product embodied in a non-transitory computer readable medium is disclosed. The computer program product includes computer readable program code being executable by a hardware data processor to cause the hardware data processor to perform a method when said computer readable program code is executed by the hardware data processor. The method may include one or more functions that allow one or more system components to perform one or more steps of the method disclosed in one or more embodiments of this disclosure.

According to an embodiment, a network comprising the dental scanning system and other network elements providing services is disclosed. The dental scanning system and other network elements include one or more disclosed features. The dental scanning system and other network elements are configured to operationally connect to establish a scanning session in accordance with the method, which may include one or more functions that allow one or more system components to perform one or more steps of the method disclosed in one or more embodiments of this disclosure.

BRIEF DESCRIPTION OF THE DRAWINGS

The embodiments of the disclosure, together with its advantages, may be best understood from the following illustrative and non-limiting detailed description taken in conjunction with the accompanying figures in which

FIG. 6 illustrates a method for acquiring data from a three-dimensional dental object according to an embodiment;

FIG. 7 illustrates a method for operationally connecting a wireless dental scanning system with one or more network elements according to an embodiment;

FIG. 8 illustrates a method for defining a group according to an embodiment;

DETAILED DESCRIPTION

In the following description, reference is made to the accompanying figures, which show by way of illustration how the invention may be practiced.

Figure 1A:
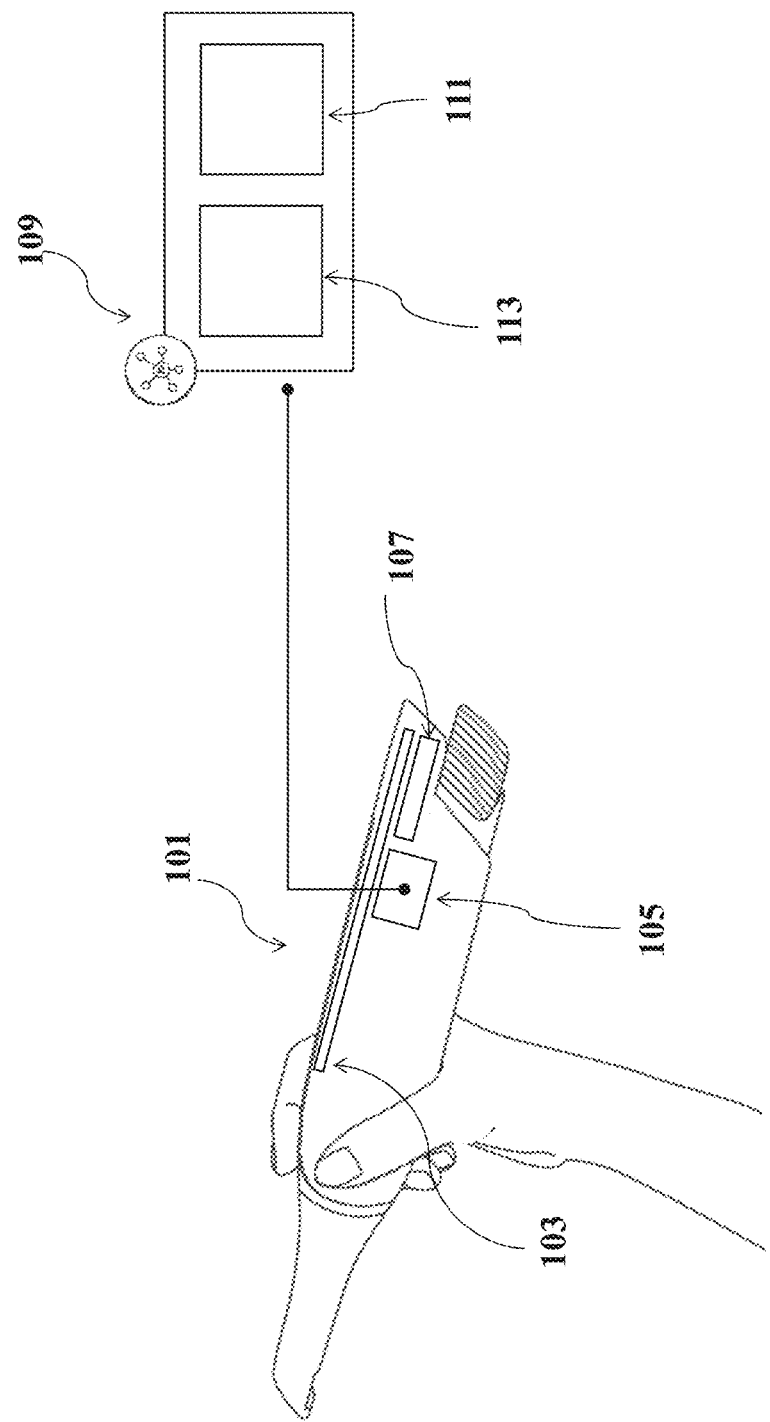
FIG. 1A illustrates a dental scanning system according to an embodiment.

FIG. 1A illustrates a dental scanning system according to an embodiment, which discloses a wireless scanning system comprising a handheld device. The handheld device 101 is a wireless intraoral scanner. The dental scanning system is configured to acquire data from a three-dimensional dental object during a scanning session. The dental scanning system includes an illumination unit (not shown) comprising a light source configured to illuminate the dental object; and a detector unit (not shown) comprising a sensor configured to receive a plurality of two-dimensional images in response to the illumination of the dental object.

The scanner includes a PCB (printed circuit board) 103 having a processor 105 configured to generate a processed data by processing one or more of the plurality of two-dimensional images, wherein a three-dimensional digital representation of the dental object is generated based on the processed data. The processor is further configured to run a wireless network unit 107 configured to wirelessly connect the handheld device to a network comprising a plurality of network elements including at least one network element configured to receive the processed data, thus allowing wireless exchange of data to and from the handheld device 101 over a network. The handheld device further includes a network operation module 109, which is a software module. The processor is configured to run the software module 109 for enabling network operation of the handheld device. For example, the network operation module 109 includes a session module 113 configured to establish the scanning session by operationally connecting, via the wireless network unit, the dental scanning system with one or more network elements.

The network operation module 109 comprises a discovery module 111 and the session module 113.

The discovery module 111 is configured to make the handheld device discoverable on a network by transmitting such as broadcasting a scanner identifier. The scanner identifier includes a device identifier, a service identifier and a domain identifier. The device identifier identifies a specific device on which the software module 109 is running on. The service identifier identifies what type of service the device offers on the network, e.g. a 3D intraoral scanning. The domain identifier identifies where on the network the service is being offered, i.e. location of the device on the network.

In an embodiment, the discovery module 111 builds upon the technologies such as DNSSD (DNS Service Discovery) and mDNS (multicast DNS). The discovery module 111 may also utilize unicast DNS. For discovery and DNSSD, two records are typically used: DNS SRV and DNS TXT.

In another embodiment, the discovery module may be configured using a custom protocol operated in a unicast or multicast-based system. Such custom protocol approach may be preferred for reasons such as for handling naming conflicts of network devices and for performing discovery of network devices and identifying IP addresses of the network devices in a single/same step such as by utilizing custom Record comprising multiple characterizing aspects. For example, naming identifying a specific device on the network may be customized such that each network device is unique based on device unique serial number. Additionally or alternatively, unlike conventional DNS protocol requiring multi-step process to communicate different characterizing aspects, custom protocol transmits a data packet (e.g. custom Record, as described earlier) that may contain multiple characterizing aspects (e.g. device unique serial number and IP address of the network device) during the initial discovery, thereby allowing for a more efficient process. The skilled person would appreciate that the custom protocol may still operate with operational principle relating to the (uni- or multi-)cast DNS, however with an exception that earlier described custom Record during discovery phase is used. In yet another embodiment, the discovery module may be configured using a centralized signaling server, for example as known from WebRTC if broadcasting by several devices on the network may be prohibited.

The DNS SRV Record has a name of the form "<Device>.<Service>.<Domain>" and gives the target host and port where the service device may be reached. The DNS TXT record of the same name gives additional information about the device. The usual form of DNS that is typically used nowadays is unicast DNS, where a single server handles the DNS requests. This server is setup and known in advance as part of a regular network setup. However, in certain scenarios where it is either undesirable or infeasible to use a pre-known centralized location. Thus, the discovery module 111 may additionally be configured to support multicast DNS. Multicast DNS works by transmitting such as broadcasting DNS records in a local area network (LAN) and keeping a cache (memory) of the DNS Records broadcasted on the network. In the cache, these records have a TTL (Time-To-Live) field that is used by the DNS server to let interested parties (network elements) know how long a record may be considered valid. Thus, the time until which the record needs to be refreshed from the DNS server is based on the TTL. Using this system, interested parties (network element) may query records for a given domain and keep them in their local cache for as long as they are valid, removing the need to look it up again immediately.

In the embodiment, the software module is compatible with a the wireless intraoral scanning device is battery powered, the TTL is tweaked to a specific time period for example to 20 sec. For this reason, the DNS Records needs to be re-broadcast at some fixed interval, shorter than the TTL time. When another device (network element), also running the software module 109, is looking for a service on the local network, it may simply check its cache for available services.

The UDP Broadcast may not be a reliable transmission protocol such as situations such as missed data package while refreshing during the TTL. Thus, the scanning system may be configured to transmit a query to the network, which somewhat mirrors the unicast DNS behavior. This may be used when an interested party (network element like the scanning system) first comes onto the network, to receive a timely update. After this initial query, it may rely on other parties updating the cache through transmission such as broadcasts. Additionally or alternatively, a network element such as a server may respond to the query with its own full cache, allowing other network elements to simply stay silent, especially if the other network elements do not see fault in the response from the network element.

Figure 1B:
FIG. 1B illustrates an SRV records according to an embodiment.

The local cache 117 may include the different types of records 115, held in the format as defined in their respect DNS specification (RFCs), such as SRV Records and A Records, which maps domain names to IP addresses. The cache of the SRV Records may therefore be illustrated by a table, as shown in the FIG. 1B. As illustrated, the cache contains different types of services advertised on the network. If an application (run by the processor) intends to identify what services exists on the network of the type _trios._tcp.local., then it may simply check its local cache to see what is available and where on the network such service is available. In practice, when the local cache is queried for a type of service, a query is may also be transmitted on the network, to increase the chance of finding all services in a timely manner.

When using mDNS for advertising services, the service identifier typically has the format "<identity>.<Service>.local", as the service is being advertised locally on a LAN. However, as DNSSD may also function on unicast DNS and as such, a service may be advertised somewhere else than locally. For example, a processing service offered locally might have a Fully Qualified Domain Name (FQDN) such as "xxxx._processing._tcp.local", but the same service being offered somewhere else than locally for example on the 3Shape.com domain might look like "xxxx._processing._tcp.3shape.com".

The discovery module 111 interfaces and understands mDNS (or uDNS) and DNSSD and enables these technologies to be tied together with the session module 113 in order to achieve a specific functionality. The session module 113 of the network operation module 109 may allow interactions between the scanning system and a piece of software or hardware to be exclusive. This is done by establishing connections between the scanner 101 and another device (network element) both running their respective software module 109 which is negotiated through their respective session module 113.

In an embodiment, a session may be negotiated by receiving, from a request sending network element, a request to the session module 113 running on the scanning system 101. The request typically contains the application-dependent information necessary for a connection to be established, such as encryption keys, necessary IP addresses or opened UDP Ports. The processor 105 is configured to determine whether the contained information is sufficient to initiate a session. If yes, then the processor is configured to respond with necessary application-dependent information and a positive exclusive reply to the session request. If the application (run by the processor) supports, a positive non-exclusive reply may also be sent, which allows multiple session to be established with the scanning system and/or the request sending network element. The scanning system and/or the request sending network element may also be individually configured to deny requests for connection from other devices (network elements) if the scanning system and/or the request receiving network element are already in a session. In another embodiment, a session may be negotiated by sending a request from the session module 113 running on the scanning system 101. The request typically contains the application-dependent information necessary for a connection to be established, such as encryption keys, necessary IP addresses or opened UDP Ports. If the application run by the processor of the request receiving network element determines that the contained information is sufficient to initiate a session, it responds with necessary application-dependent information and a positive exclusive reply to the session request. The session module 113 of the scanning system 101 is configured to receive the necessary application-dependent information, and a session may be established between the scanning system and the network element with which the application-dependent information is exchanged. If the application supports it, the scanning system and/or the request receiving network element may transmit a positive non-exclusive reply, thus allowing multiple sessions to be established with a single device (scanning system or request receiving network element). The scanning system and/or the request receiving network element may also be individually configured to deny requests for connection from other devices (network elements) if the scanning system and/or the request receiving network element are already in a session.

The combination of the session module and the discovery module may allow the establishment of a session to be advertised on the network, by adding an entry in the TXT record with a state of the advertised service. If there is an exclusive connection to a service, the service may advertise its state as "non-idle", to notify other elements on the network, that the service is not immediately possible for them to establish a connection. Furthermore, additional information may also be advertised such as one or more of Access Point to which the scanner is connected to, processing unit the scanner is connected to, or user/operator logged in the processing unit/display.

Figure 2:
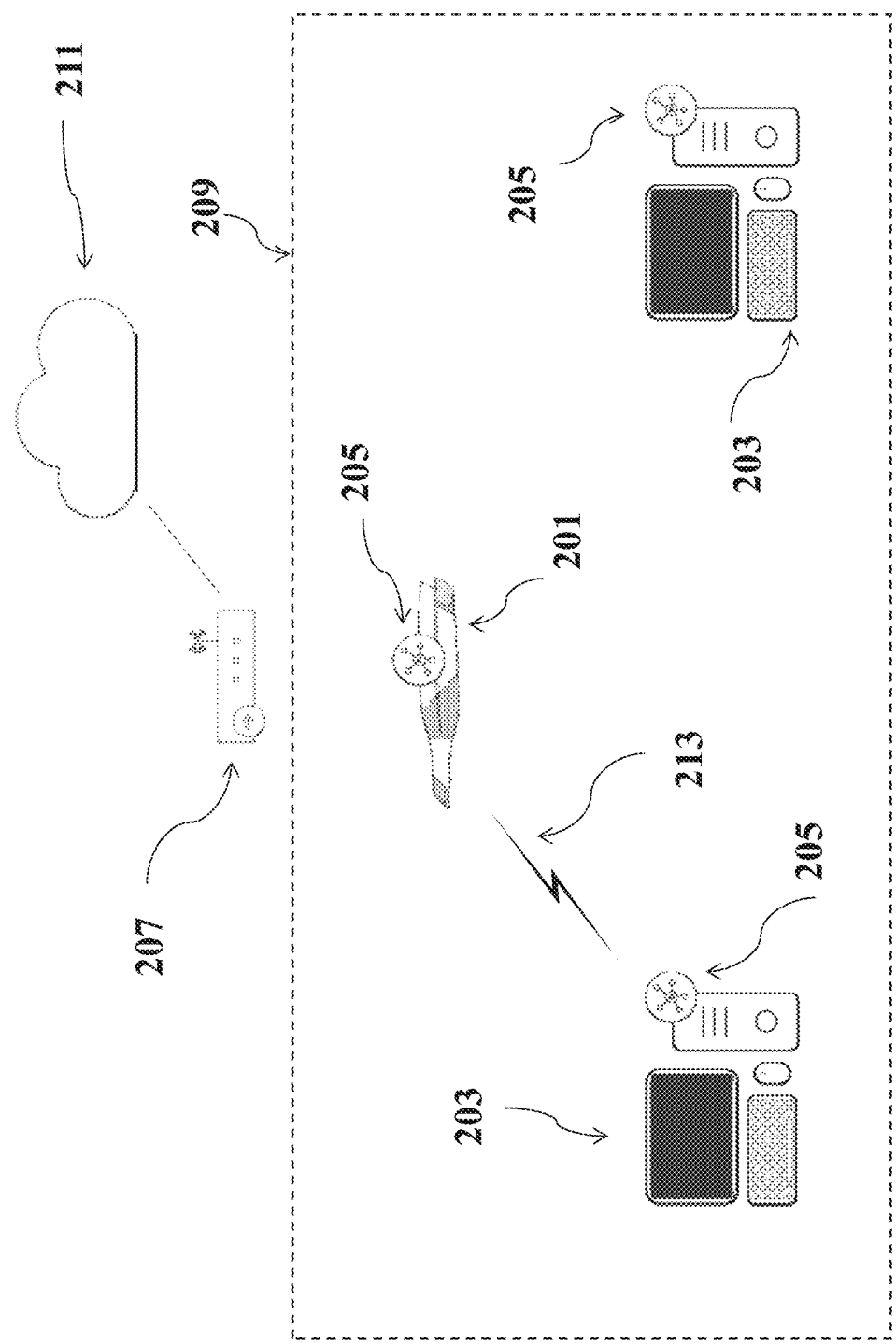
FIG. 2 illustrates a network comprising interconnected network elements according to an embodiment.

FIG. 2 illustrates a network comprising interconnected network elements according to an embodiment. The figure illustrates a dental scanning system such as a single wireless intraoral handheld scanning device 201 and two computers 203 installed at a dental clinic having two treatment rooms. The term "room" is not restricted to include only separate rooms, but the term may also include separate scanning stations such as a computer next to dental chairs even if the such scanning stations are physically located in the same room. The dental clinic is equipped with a Wi-Fi router 207 which is creating a Wireless Local Area Network 209 in the clinic and is also connected to the internet 211. Both the scanning device 201 and the computers 203 are connected to the local area network. Here a computer is understood as a cluster containing all the essential components for handling raw scanning data. i.e. processing power (CPU, GPU), storage space (HDD, SSD), digital display capability (monitor, screen) for rendering 3D reconstruction and build-up of the 3D model during scanning and human interface derives like mouse and keyboard or touch screen to interact with the software user interfaces running on the local computer. Each of the computers 203 are located in each of the treatment rooms in the clinic and the wireless intraoral scanner 201 is shared between the rooms hence moved back and forth between the two rooms when it is needed during patients' visits, for example for scanning the intraoral cavity of a patient. Both the scanning device 201 and the computers 203 are running the network operation module 205 as described earlier in relation to FIG. 1.

In a typical work environment, the wireless scanner 201 is moved back and forth between patients in the two rooms. The network operation module 205 running on all devices are enabling the scanner to dynamically create and terminate sessions with each of the computers 203 in a dynamic manner. In case the scanner had been used in relation to a patient in Room no. 1 and is to be used in connection to a treatment of a new patient in Room no. 2, the operator carrying the scanner to the computer in Room no. 2 may perform a dedicated user interaction 213 such by entering scanner credentials at an identification network element, thus allowing the scanner to establish a connection with the computer 203 in Room no. 2. The dedicated user interaction 213 may include manually selecting the scanner from a user interface (UI) displaying the cache list associated with the software module 205 running in the scanning application on computer. Other mechanisms to detect a scanner may also be employed such as reading an RFID tag from the scanner, or, scanning a QR code from the scanner, or detecting a scanner radio beacon such as Bluetooth beaconing or Wifi Access Point advertising.

Figure 3:
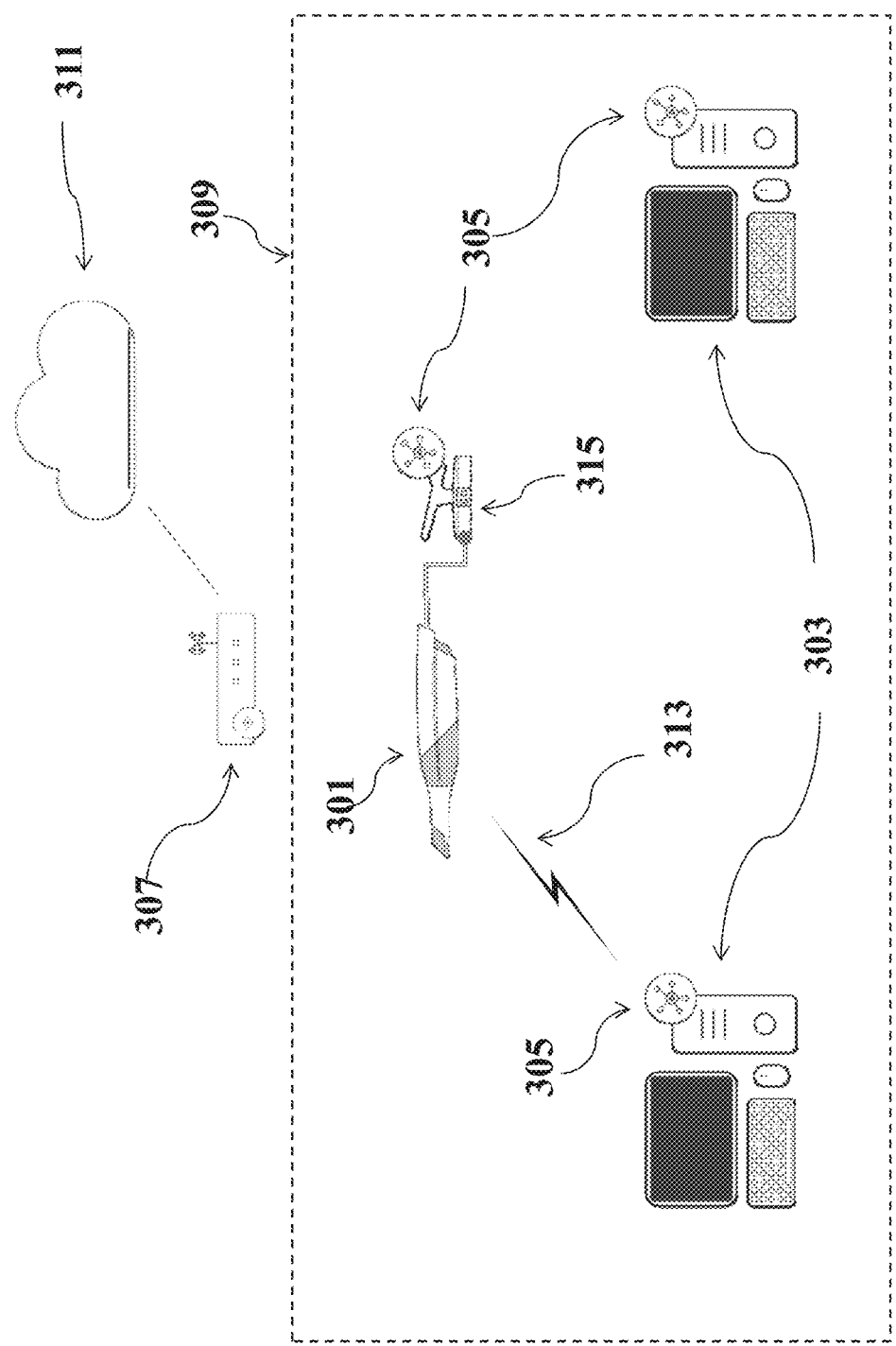
FIG. 3 illustrates a network comprising interconnected network elements according to an embodiment.

FIG. 3 illustrates a network comprising interconnected network elements according to an embodiment. The figure illustrates a handheld device 301 installed at a dental clinic having two treatment rooms, thus illustrating a situation similar to that of FIG. 2. However, in addition to a single wired intraoral handheld scanning device 301, and two computers 303, there exists a wireless unit (smart pod hub 315) for connecting with the scanner. The smart pod is configured with a processor and a wireless module (wireless network unit+network operation module). The dental clinic is equipped with a Wi-Fi router 307 which is creating a Wireless Local Area Network 309 in the clinic and is also connected to the internet 311. Both the smart pod 315 and the computers 303 are connected to the local network. Each of the computers 303 are located in each of the two rooms. The term "room" is not restricted to include only separate rooms, but the term may also include separate scanning stations such as a computer next to dental chairs even if the such scanning stations are physically located in the same room. In the clinic, the wired intraoral scanner is shared between the rooms and hence moved back and forth between the two rooms when it is needed during patients' visits. In this example the wired scanner 301 is connected to the smart pod 315 through a wire. The smart pod 315 may also be configured to provide power and wireless functionality to the scanning device. The smart pod 315 may provide power to the scanner 301 either from batteries in the pod or directly from the power grid through a wire. The handheld scanning device 301 in combination with the smart pod 315 represents the dental scanning system. The smart pod 315 is carried along with the scanner 301 from one room to the other making the scanning handheld device 301 portable. Both the dental scanning system (i.e. handheld scanning device+ smart pod) and the computers 303 are running the network operation software module as described in relation to the FIG. 1.

In a typical work scenario, the handheld scanning device 301 and smart pod 315 are moved back and forth between the two rooms. The network operation module 305 running on the devices are enabling the scanner (when connected to the smart pod 315) to dynamically create and terminate sessions with each of the computers 303 in a dynamic manner. If the dental scanning system is used in relation to a patient in Room no. 1 having the first computer, but now needs to be used in Room no. 2 having the second computer; a trigger event at the Room no. 2 may be performed such as reading an RFID tag of the scanning system at a identification network element associated with the Room no. 2. Additionally or alternatively, the operator carrying the scanning system (301 and 315) to the computer 303 in Room no. 2 may perform a dedicated user interaction 313. The trigger event and/or a dedicated user interaction enables the scanning system to establishes a connection with the new computer using the network operation modules 305 running individually on the scanning system and the computer in the Room no. 2.

Figure 4:
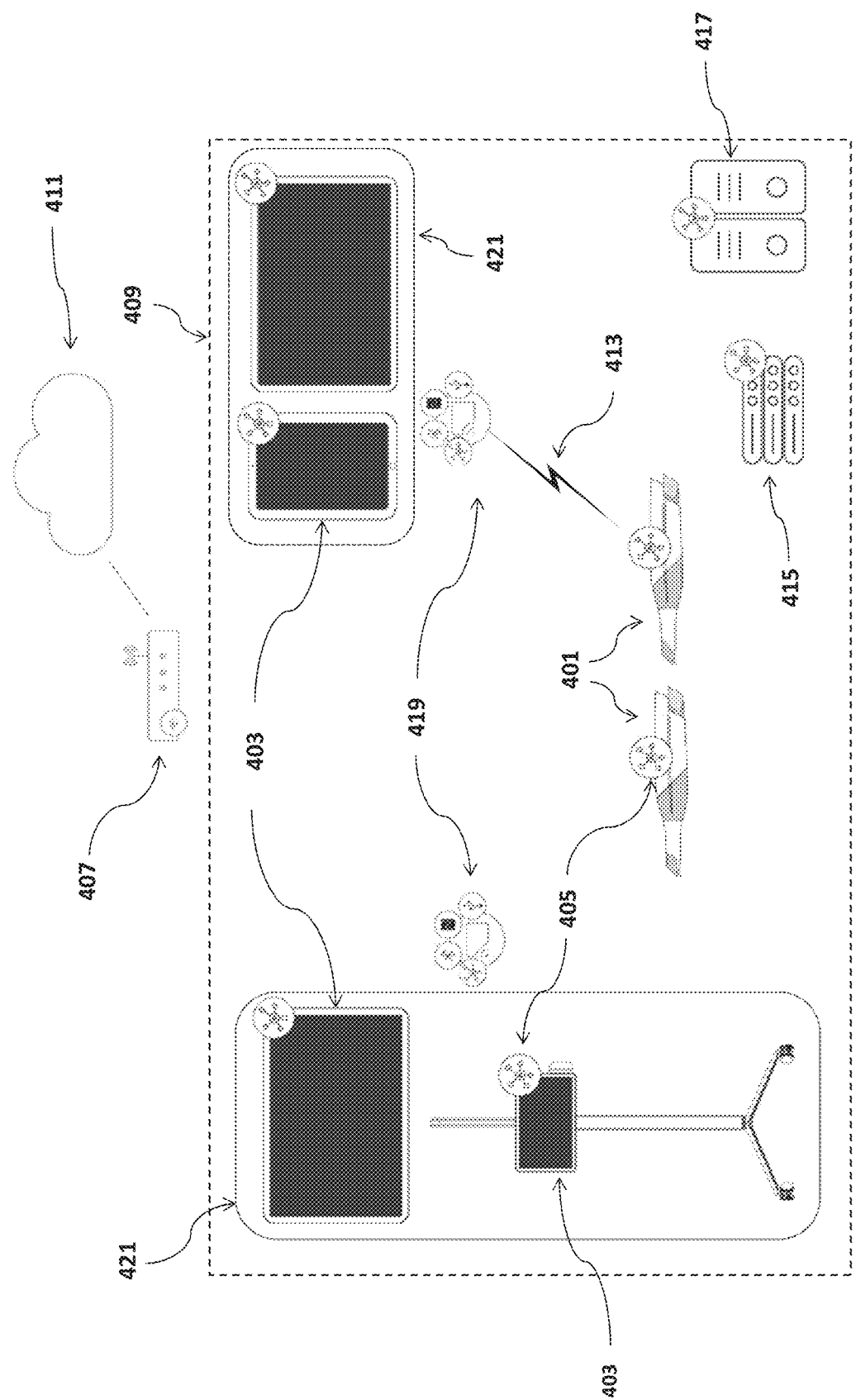
FIG. 4 illustrates a network comprising interconnected network elements according to an embodiment.

FIG. 4 illustrates a network comprising interconnected network elements according to an embodiment. The figure illustrates a more comprehensive network at a dental clinic containing two or more individual treatment rooms. The term "room" is not restricted to include only separate rooms, but the term may also include separate scanning stations such as a computer next to dental chairs even if the such scanning stations are physically located in the same room. The network comprises multiple wireless intraoral scanning devices 401 (representing multiple dental scanning systems), multiple monitors 403 (representing displays), a local storage server 415, a local processing cluster 417 (remote processor), and a number of trigger point devices 419 (representing identification network elements). The dental clinic is equipped with a Wi-Fi router 407 which is creating a Wireless Local Area Network 409 in the clinic and is also connected to the internet 411. All devices (network elements) are directly or indirectly connected to the local area network.

The monitors 403 may include a smart TV, tablet or other types of display devices containing a processor and Wi-Fi module or it may instead include screen display with a HDMI input socket and a dedicated dongle or box. Here the dongle or box is configured to provide the processing and network functionality (wireless network unit+network operation module) when attached to the screen. The monitors 403 are capable of for displaying and rendering the 3D representation based on the processed data or dental designs prepared in CAD software relating to restorative or orthodontic treatment.

The local storage server 415 may be located in the clinic such as in the clinic basement, and may be used primarily for the purpose of handling storage (HDD, SSD) and backup of digital files and software. The local processing cluster 415 may likewise be located in a dedicated room away from the clinic workspace i.e. scanning stations. The processing cluster 417 is configured to deliver processing power (CPU, GPU). The processing cluster is running software configured to handle scanning data such as processed data received from the scanning system 401 and construction of the digital 3D representation of the dental object during the scanning session. The clinic contains additionally a number of human interface derives like mouse and keyboard or touch screen to interact with the software user interfaces running through a dedicated session on the local processing cluster 417. The wireless intraoral scanning system 401 are shared in the clinic hence moved back and forth between the different treatment rooms when it is needed during patients' visit. The network elements comprising wireless intraoral scanning devices 401, the multiple monitors 403, the local storage server 415, the local processing cluster 417, and a number of trigger point devices 419 (identification network elements) are connected to a processor such as individual processor on these devices running the network operation module 405 as described in relation to FIG. 1.

Some of the treatment rooms in the dental clinic may be equipped with multiple display devices, e.g. a large screen on the wall along with a moveable monitor on an ergonomically friendly arrangement and a tablet. For connecting the scanning system 401, processor 417 and storage 415 services to display content and/or renderings on multiple display the concept of grouping may be utilized. A group may include a number of monitors (preferably located in the same room) but the group may also include specific processing capability and storage units. A group is understood as a number of available services advertised on the network as explained in relation to FIG. 1.

Whereas a simple scenario comprises a connection between the scanning system and a computer, the concept of grouping may allow multiple connections to be established between different services which would not otherwise be affected by the connection between the scanning system and the computer, for example during the scanning session. This may allow the operational connection between the scanning system and a computer to be understood in a broader context, i.e. to include the intent of the user to scan the dental object, rather than simply to pair the scanning system and the PC. As part of this intent, the dentist may desire to
- establish a first operational connection between the scanning system and a remote processing unit, external to the scanning system, to generate the 3D representation of the dental object based on the processed data
- establish a second operational connection between the remote processing unit and a first monitor facing the patient to show a simplified view with only the patient-relevant data on the first monitor,
- establish a third operational connection between the remote processing unit and a second monitor facing the dentist to show an interactive view of the generated 3D representation on the second monitor,
- setup software to be in a state where scanning is possible, and advertise that the scanner is in use In a group of units 421 may also contain a trigger point device 419. The trigger point device 419 may be configured to establish a session between all the predefined devices in the group and the scanning system 401 when a trigger event occurs. This may include triggering of an even based on a user interaction 413. The trigger device 419 may have additional capability of connecting the necessary human interface devices like mouse and keyboard or touch screen to interact with the session running in the group 421. The connection between multiple services may be negotiated by allowing the trigger-device to function as a proxy-negotiator, negotiating the connection on behalf of others in the group. Another approach is for the initial group setup to provide a secret key, which can be provided during negotiation to override existing connections.

In a typical work scenario, the wireless scanning system 401 is moved back and forth between patients in the different treatment rooms. The network operation module 405 running on the devices (network elements) enable the scanning system to dynamically create and terminate sessions with each of the devices in the groups 421 in a dynamic manner including processing 417 and storage 415. In one case the trigger point device 419 is equipped with near field communication (NCF) or radio frequency identification (RFID) technology. The scanning system 401 are accordingly configured with a NFC or RFID chips (reader or writer) such that the operator may simply just pass the scanning system 401 close by the trigger device 419 in order to perform the user interaction 413 needed to establish the intended session.

Instead of NFC/RFID technology, the trigger point device 419 may use Bluetooth technology. In this scenario, the scanning systems 401 are configured to transmit a Bluetooth signal and the trigger point devices 419 are monitoring the Bluetooth signal strength from all devices. In this case, the operator may simply need to bring a scanner into close proximity (i.e. into the room) of the trigger point device in order to automatically establish a session between the scanning system and the group associated with the room (trigger point device) as the Bluetooth signal strength increases above a specific threshold value.

In another embodiment, the scanner itself may function as a trigger device, by triangulating its position using the 802.11mc standard or similar. When the scanner finds itself close to a pre-configured position it may interpret the change in position as the user interaction trigger.

The information being displayed on the screens in the group may typically be transmitted via the network, either through off the shelf streaming software, desktop virtualization software, 3D streaming software. To achieve sufficiently low latency, some form of hardware encoding and decoding may be applied, such as the h264 and h265 video compression standards.

Figure 5:
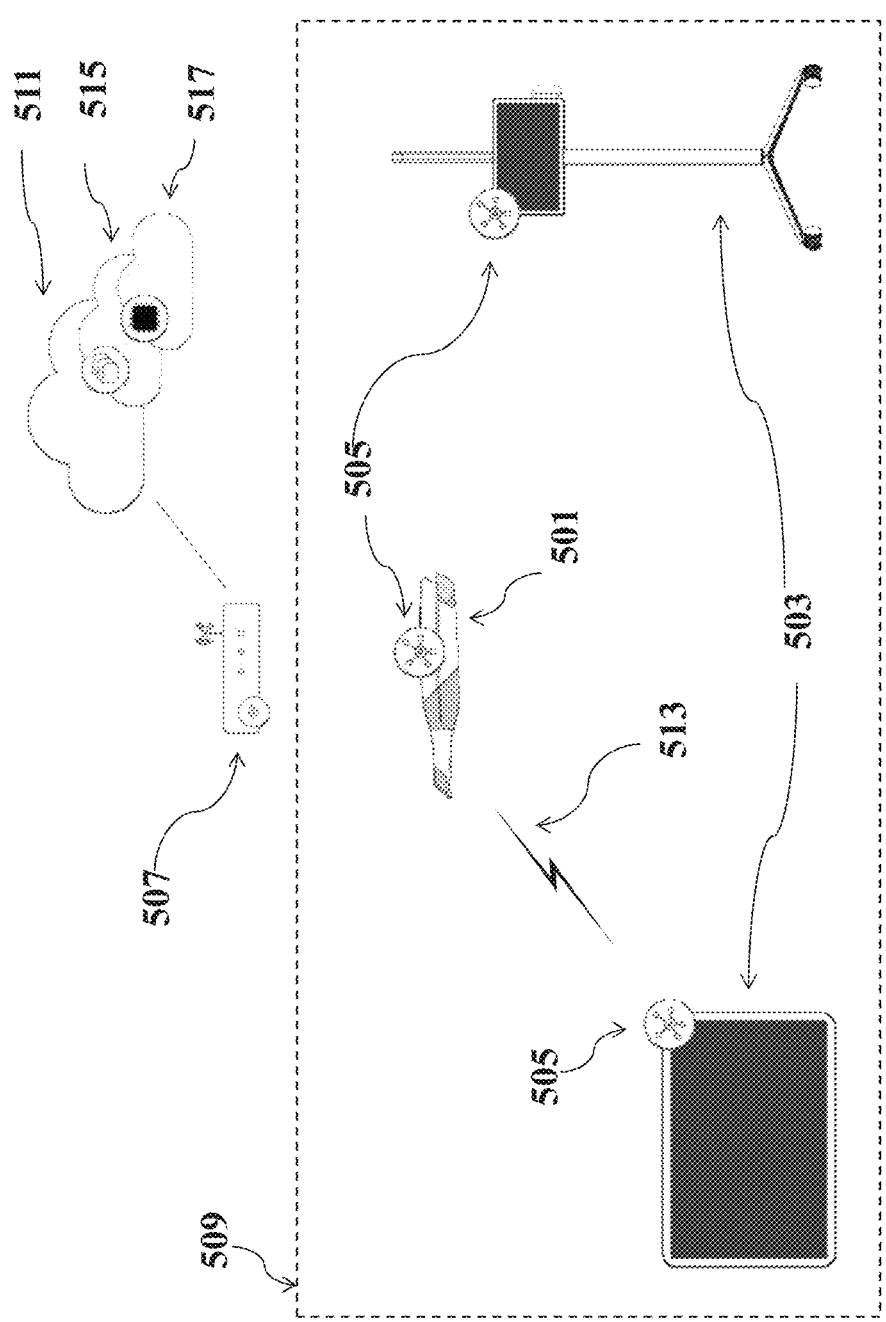
FIG. 5 illustrates a network comprising interconnected network elements according to an embodiment.

FIG. 5 illustrates a network comprising interconnected network elements according to an embodiment. The figure illustrates a network comprising a single wireless intraoral scanning system 501 and two monitors 503 installed at a dental clinic having treatment rooms. The term "room" is not restricted to include only separate rooms, but the term may also include separate scanning stations such as a computer next to dental chairs even if the such scanning stations are physically located in the same room. The monitors 503 may include a smart TV, tablet or other types of display devices containing a processor and Wi-Fi module or it may instead include a screen display with an HDMI input socket and a dedicated dongle or box configured to provide the processing and Wi-Fi functionality (wireless network unit+network operation module) when attached to the screen. The monitors are configured to display and render 3D representation of the dental object based on the processed data. The dental clinic is equipped with a Wi-Fi router 507 which is creating a Wireless Local Area Network 509 in the clinic and is also connected to the internet 511. All devices (network elements) in the scanning system are directly or indirectly connected to the local area network.

In this embodiment, the local area network lacks a remote local storage or remote processing capabilities, i.e. external to the scanning system. Instead such remote storage and remote processing is available as a cloud-based storage 515 and cloud-based processing 517 through the internet connection. The "cloud-based" refers to remotely installed services not physically present at the premises (i.e. clinic) or available in the Local Area Network provided by the router 507.

In this scenario, the devices (network elements) including the scanning system running the network operation module 505 rely on a centralized location/database such as Unicast DNS or a signaling server (as is used in Web Real Time Communication WebRTC) for sharing operational state and advertising services on the network. By relying on the Unicast DNS, the setup requires a centralized server (e.g. cloud based server) maintaining the cache list of all services belonging to the specific domain.

In this cloud-based processing environment, network elements such as the scanning system and the processing services register themselves to a centralized DNS server. As the DNS server keeps track of the list of services, the network elements such as the scanning system and the processing services may find one other because the network elements have access to this server. To establish a connection between the two, some sort of trigger event is necessary, as described earlier. On triggering the event, one network element receives the IP address of the service needed. For example, the scanning system may be receive the IP address of the processing service or the service may be given the processing IP of the scanning system. Once the IP address is received, a session negotiation proceeds in a way similar to negotiation of a session with a locally available service. A technology such as Session Traversal Utilities for NAT (STUN), Traversal Using Relays around NAT (TURN) or Interactive Connectivity Establishment (ICE) may be used for the initial negotiation to be successful, if the network element such as the scanning system is on a network behind a Network Address Translator (NAT) device.

Some form of identification and registration may be necessary to filter the available services based on what the given user has been giving access to/paid for. For devices, this may be performed at a serial number level, where it is known ahead of time that a given scanner is owned by a specified user or organization.

In a typical work environment, the wireless scanning system 501 is moved back and forth between patients in the two rooms. The network operation module 505 running on all devices (network elements) enable the network elements such as the scanning system to dynamically create and terminate sessions with a mix of local monitors 507 and cloud based services such as remote storage 515 and remote processing 517. In the case the scanning system is used in relation to a patient in Room No. 1 and is to be used in connection to a new patient in Room No. 2, a trigger event needs to occur such as the operator carrying the scanning system to the Room No. 2 performs an action. For example, a tablet with a touch screen may be mounted on the side of the doorway of Room No. 2 or in the Room No. 2. The tablet displays a user interface (UI) representing the floor plan of the clinic along with a hovering scanner icon. The user interface is interactive, such that the operator may drag and drop then scanner icon representing the scanning system which the operator is physically carrying into the room. By dropping the specific scanning system icon on the outline of the room on the UI, a user interaction 513 is performed and the scanning system is assigned to the Room No. 2 and automatically connected to the group associated with the Room No. 2.

In another case, the user interaction 513 may depend on indoor wifi tracking. The clinic may have installed a number of wifi routers/repeaters such as 3 or more wifi routers/or repeaters in different locations. The signal strength of the hot spots may be used to triangulate the position of the scanning system from the wireless module (wireless network unit) located inside the scanning system. By entering a room as determined by the position tracking through triangulation, the scanning system may automatically connect to devices (network elements) associated with the room. Setting up such a scenario may require that the scanning system is set in a calibration/recording mode, and the scanning system is moved around in a room to map it according to signal strength of the wifi hot spots. After the outer boundaries of the room has been defined, that scanner may be moved to the next room to repeat the procedure there by setting up the different rooms in the clinic for later automatic connections.

As illustrated above, a number of network configuration specially in relation to multicast DNS and unicast DNS are disclosed. The skilled person would realize that for small networks, Multicast DNS works quite well because it doesn't require a centralized server. Therefore, setup of the individual network elements on the network to be made aware of such a centralized server may be avoided. Such network may work simply by virtue of having a medium of communication where the network element may communicate to one other through multicast and broadcast messages.

However, an mDNS based system may become untenable when the scale of the network is unknown. Additionally, the mDNS based system may work in a local setting and any attempt to use mDNS across different networks is likely to fail.

In contrast, Unicast DNS based system is one of the largest scale systems in the world. Therefore, if a network grows large enough then a centralized location/database such as unicast DNS server or a signaling server (as is used in Web Real Time Communication WebRTC) based system may provide an optimized solution, rather than relying on multicasting. Additionally, it may be desired to use services which exist outside the network—such as cloud-based storage or processing—which would only be possible using unicast DNS.

In an embodiment, a network may utilize both multicast DNS and the centralized database (e.g. unicast DNS), such that multicast DNS may allow services on Local Area Network to find the scanning system while the scanning system attempts to register itself to a cloud server. Additionally, it may be that a large-scale organization, such as a dental school, may choose to disable multicast DNS and rely only on the centralized database (e.g. unicast DNS). Several possibilities for service distribution and access of such services exists for networks relying on both multicasting and unicasting and would be apparent to the skilled person.

FIG. 6 illustrates a method 600 for acquiring data from a three-dimensional dental object according to an embodiment. At 601, a wireless dental scanner is identified by receiving a scanner credential associated with a dental scanning system at an identification network element. At 603, at least some of the network elements transmitting an idle state are identified, the network elements being interconnected in a network and comprising at least two of the dental scanner, display unit, or processing unit. Lastly, at 605, a scanning session is established by operationally connecting the identified dental scanner and a selection of one or more network elements from the at least some of the network elements transmitting the idle state.

FIG. 7 illustrates a method 700 for operationally connecting a wireless dental scanning system with one or more network elements according to an embodiment. At 701, a scanner credential associated with a dental scanning system is received at an identification network element. At 703, in response to the input of the scanner credentials at the identification network element, a determination is made whether the wireless dental scanning system is registered with the network. The network includes a plurality of network elements comprising at least a display unit, and a processing unit. At 705, the wireless dental scanning system is permitted to operationally connect to one or more network element of the plurality of network elements to establish a scanning session when the dental scanning system is determined to be a registered dental scanning system. Alternatively, at 707, the wireless dental scanning system is denied to operationally connect to the one or more network element of the plurality of network elements when the dental scanning system is determined to be an unregistered dental scanning system, i.e. unregistered with the network. Additionally or alternatively, a device registration process may be initiated at 709 when the dental scanning system is determined to be an unregistered dental scanning system, i.e. unregistered with the network.

FIG. 8 illustrates a method 800 for defining a group according to an embodiment. At 801, an instruction to select at least two network elements from a list of plurality of the network elements is received. Then, at 803, the selected at least two network elements are associated to each other; and lastly a group comprising the associated at least two network elements are defined at 805.

Figure 9:
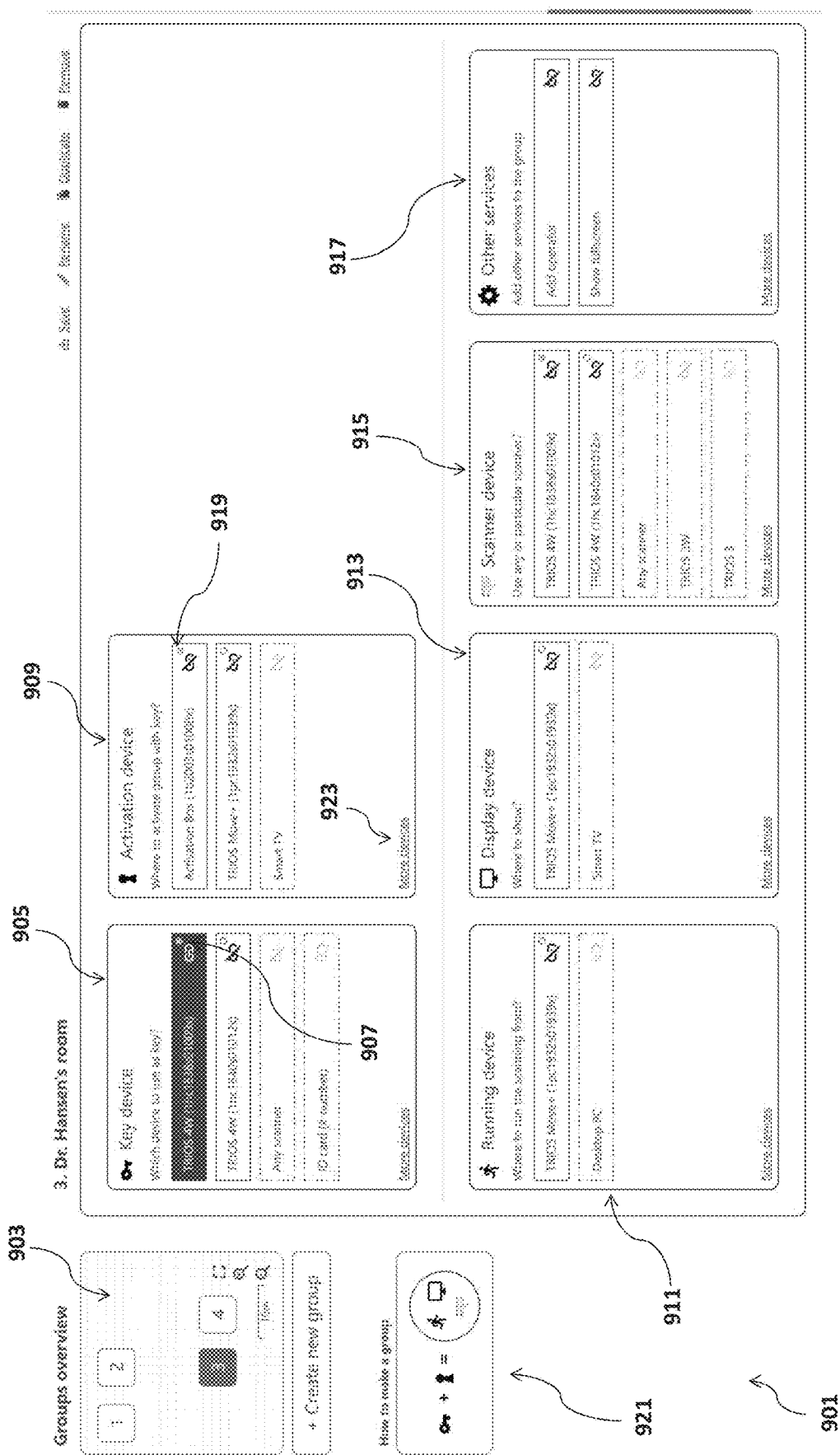
FIG. 9 illustrates a user interface (UI) for defining a group according to an embodiment.

FIG. 9 discloses a user interface (UI) for defining a group according to an embodiment. Thus, a schematic illustrative user interface 901 for setting up a dental clinic is explained. The user interface 901 is configured to facilitate defining the group. This may be performed during, for example when the clinic is set up for the first time, expanding the network with additional network elements or simply a reconfiguration of hardware on the premises.

Using awareness technology (NFC, WiFi, Bluetooth) it may be possible to determine where a device is located physically on a premise and how to pair it up with a computer or other setup. Furthermore, the network elements forming the group are typically capable of running the network operation software module. The user interface is configured to link the network elements, forming the group, together.

In an embodiment, a user intends to setup the configurations of one or more treatment rooms in the clinic to be able to connect to a specific setup configuration (group) of two or more network elements configured to be operationally connect to one another in a specific room in and easy and efficient way.

One purpose of the user interface may be first; to be able to group network elements together such that the network configuration among network elements located in the dental clinic is reflected in digital representation. Second; using the configuratior user interface may allow to define the network element(s) the clinical professional may use to trigger or activate a specific group when performing the specific user interaction in order to enable all network elements in the group to establish one or more operational connections with one another.

In one embodiment, the groups are dynamic in the sense that some network elements may be stationary, i.e. located in a physical location associated with the group whereas other network elements may be stationary located outside the physical location and shared in multiple groups like central servers providing storage and/or processing capability etc. Some network elements may be cloud based e.q. cloud storage. Even further some network elements may be movable, like a scanner or a tablet, and carried between different rooms. Such movable network elements may be part of several groups at the same time.

The user interface 901 may provide a smooth and intuitive workflow, where the user may be guided through the necessary steps to configure one or more groups. In one case an outline of simple boxes with restricted options is used for easy guided workflow. The boxes may include prompt boxes like pop-ups configured to display one or more network elements and to receive an input from the user as part of a guided workflow. The input may be in response to a number of displayed options which the user need to choose from.

The user interface 901 may display a graphical overview of the created groups 903 for the user to easily navigate through and edit. The group overview may be in the form of a floor plan displaying a schematic overview of the physical locations of the groups to facilitate intuitive group browsing or it may be in the form of a numerical/alphabetic or chronological list of the created groups. The group may be formed by selecting at leas t one key device, at least one activation device, and a plurality of network elements such as running device, display device, scanner device, or other devices, as illustrated by 921.

The UI may be configured to prompt the user to perform a manual selection of at least one 'key device' (e.g. TRIOS 4 W (1hc1838s01009x) for the specific group in a first box 905. This box may typically provide a list of selectable network elements connected to the network and may be selected as the key device. The key device includes a network element(s) which is to be used during the dedicated user interaction to activate a given group. In one case a specific scanner may be selected, in another case just 'any scanner' and/or an ID card can be selected. A key device may not be restricted to a single network element, but multiple network elements can be used as key devices such as both a scanner and/or an ID card.

An icon 907 in relation to a network element may indicate if the network element is linked or unlinked in the specific category. Where linked means that the specific network element is selected by the user to be used as the 'key device' during the dedicated user interaction.

The next step may include selecting the identification network element here called 'activation device' (e.g. Plexus Box from a box 909). The activation device includes a counterpart of the 'key device' to perform a successful group activation by performing a dedicated user interaction as explained earlier. The identification network element may be proximity sensors, card reader, drag and drop UI or any other component which supports the action which is required to be performed by the user with the 'key device' to activate the group during the dedicated user interaction. Again multiple activation devices may be chosen to enable multiple ways of accomplishing a successful group activation.

A group may additionally consist of a computer to run the scanning software, a display to show the live renderings and a scanner to generate scan data. Thus, subsequent to selecting the key and activation device, the additional network elements of the group may be defined. This may include defining what 'running device' 911 is needed i.e. what network element with processing capability may be used to run dedicated software applications and process scan data, like a PC or a server. Further, this may include defining what 'display devices' 913 i.e. which network elements may be used to display the graphical control and renderings from the 'running device'. Further, this may include defining the 'scanner device' 915 that may be configured to work with the group i.e. which dental scanning system may be utilized in a specific group. These configuration options (911, 913 and 915) may likewise be displayed in a box populated by the relevant network elements only. Some of the configurations may be interdependent, such that if a specific scanner (or any scanner) is chosen as the 'key device' and a smart TV with NFC reader as the activation device, these units may automatically appear in the subsequent relevant configurations steps by default. Additionally, 'other devices' 917 may be added to the group which may refer to other types of network elements which may be utilized on the network such as 3D printers, milling machines. X-ray CBCT or even third part hardware or software applications accessible through the network.

In one embodiment, the boxes may be presented simultaneously but enabled one after another in a sequence prompting the user to make the selection in a sequence, i.e. when the selection is required, and otherwise shield the user from information overflow and too many choices. The boxes may only show some network elements for the specific step, and not all to pick from. But the selectable list may be expanded, for example using link 923 for the box 909. In another embodiment, all the boxes may be presented and enabled simultaneously without the sequential selection limitation of the prior embodiment. In yet another embodiment, the UI may be in the form of a step wizard with the display of only one box at a time. Upon configuration the UI may display network elements that are linked to one another and are online/offline (e.g. 919).

As an illustrative application, the users may log-in using a personal ID card and get a scanner connected to a specific desktop such that no manual login and connection of a personal scanner may be needed. The key device could be set up to be 'ID card' and 'activation device' may be a 'card reader'. The dentist may swipe the personal ID card against a reader and get the one shared scanner registered to his PC in his clinic, so that he only needs to put in the battery and start the scanning procedure. This will allow for that the scanner to be disconnected from whoever had the scanner last time.

The UI 901 may be configured to populate a list of specific network elements by evaluating the user specific historical data relating to selection in different boxes when guiding the user through the setup.

Figure 10A:
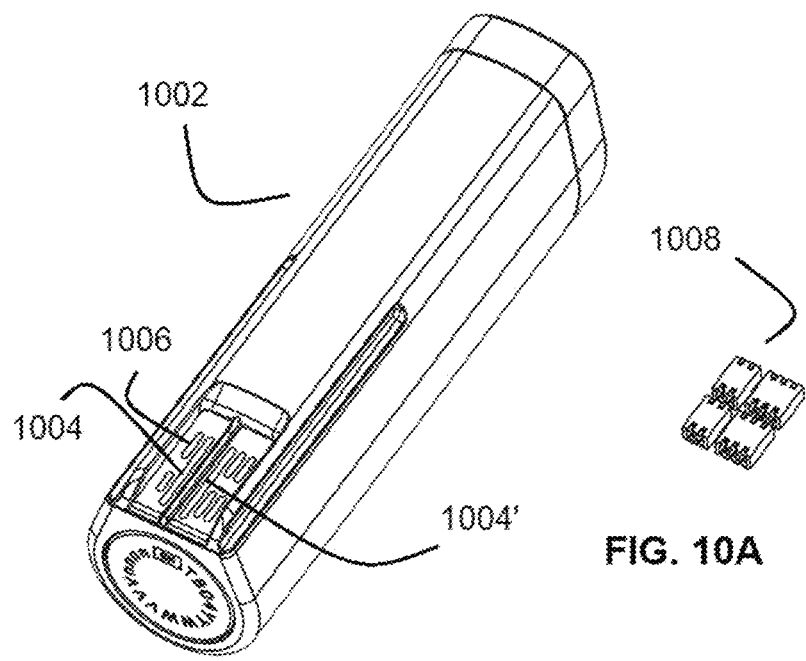
FIG. 10A illustrates a first view of a battery and connector-element unit for a battery slot of the scanning system according to an embodiment.
Figure 10B:
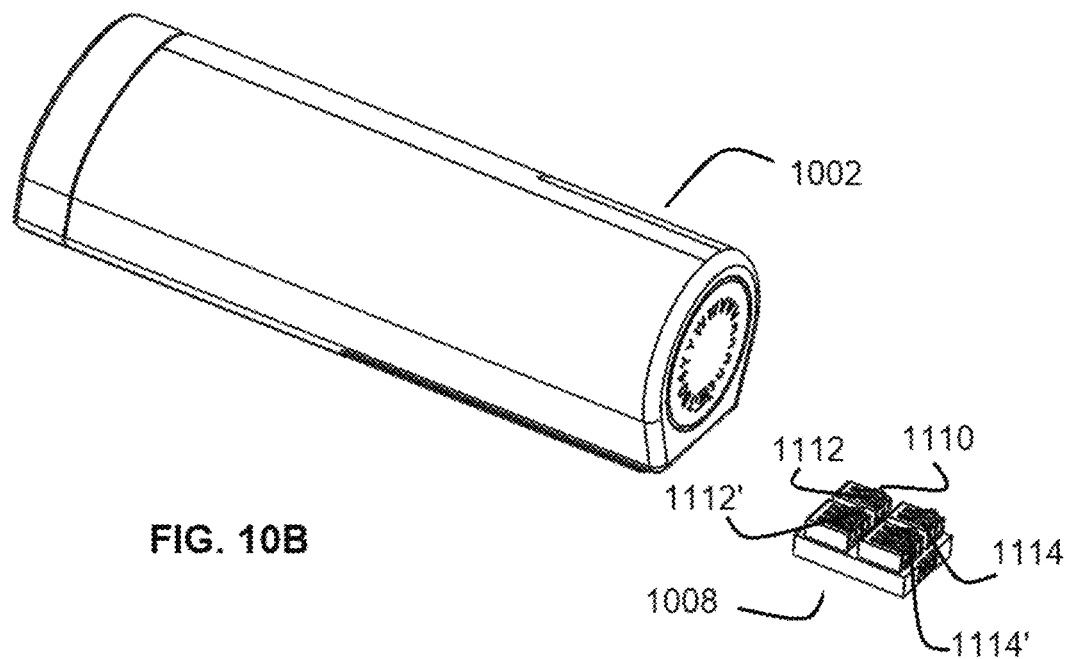
FIG. 10B illustrates a second view of a battery and connector-element unit for a battery slot of the scanning system according to an embodiment.

Referring to FIGS. 10A and 10B that illustrate different views of a battery and connector-element unit for a battery slot of the scanning system according to an embodiment. The embodiment illustrates the battery 1002 comprising a lengthwise electrical terminal 1004, 1004' and a lengthwise electrical element 1006, where the length of the electrical element 1006 is less than the length of the electrical terminal 1004, 1004'. The electrical connector 1006 and electrical element 1006, 1006' of the battery are configured to establish connection with the corresponding electrical connector 1110 and electrical element 1112, 1114, 1112', 1114' of the connector-element unit 1008 of the battery slot, which is comprised in the scanning system. The illustration shows that the battery 1002 comprises the lengthwise electrical terminal/element and the connector-element unit 1008 comprises spring loaded projected elements and connectors. However, in another embodiment, the battery 1002 may include spring loaded projected elements and connectors and the connector-element unit may include the lengthwise electrical terminal/element. Similarly, the illustration shows lengthwise connector and element, but it would be apparent to the skilled person that the disclosed principle is applicable for a battery that is inserted or withdrawn by way of a relative rotation of the battery with respect to battery slot. In such a case, the contact length is along the rotation direction and the withdrawal direction is in the direction of the rotation. Such variation is also within the scope of the disclosure.

The battery slot comprising the connector-element unit 1008 is configured to receive the battery and comprising electrical terminals 1004, 1004' configured to establish an electrical connection with corresponding electrical terminals 1112, 1114, 1112', 1114' of the battery to power the scanning system. The connector-element unit 1008 further includes an element 1110 in contact with a corresponding element 1006 of the battery such that a contact length between the elements in the direction of removing the battery from the battery slot is shorter than a contact length between the electrical terminals.

The contact length in relation to the elements may be defined as the length along which the element and corresponding element maintains contact (such as electrical contact for electrical elements) during the battery removing process. The contact length in relation to the terminals may be defined as the length along which the electrical terminal and corresponding electrical terminal maintains electrical contact during the battery removing process.

As illustrated, the positioning of the contact length corresponding to the elements in the direction of removing the battery is such that contact between the corresponding elements of the scanning system and battery is broken prior to breaking the contact between the corresponding electrical terminals of the scanning system and battery. Because of sequential disengagement of the corresponding elements prior to the corresponding electrical terminals during the battery removing process, the battery may provide power to the scanning system to send the operational state to the network before the battery is completely withdrawn.

The scanning system may include a detection module (not shown) configured to detect loss of connection between the corresponding elements. The detection module may be configured to measure an electrical property, for example if the elements include electrical elements i.e. elements that are electrically connected in a measurement circuit, such that the measurement represents the contact or loss of contact between the corresponding elements of the scanning system and battery. In response to the measurement, i.e. detection of the loss of connection between the corresponding electrical terminals, the scanning system (e.g. discovery module) is configured to transmit operational state of the scanning system to the network, i.e. to other network elements and/or to a server. Such operational state may include a non-idle state if the battery is removed when the scanning system is already in a scanning session.

List of Items

1. A dental scanning system for acquiring data from a three-dimensional dental object during a scanning session, the dental scanning system comprising an illumination unit comprising a light source configured to illuminate the dental object;

a detector unit comprising a sensor configured to receive a plurality of two-dimensional images in response to the illumination of the dental object;

a processor configured to generate a processed data during a scanning session by processing one or more of the plurality of two-dimensional images, wherein a three-dimensional digital representation of the dental object is generated based on the processed data; and a network unit configured to connect the dental scanning system to a network comprising a plurality of network elements including at least one network element configured to receive the processed data, the network unit may include a wireless network unit or a wired network unit.

2. A dental scanning system according to item 1, further comprising a network operation module comprising a session module configured to establish the scanning session by operationally connecting, via the wireless network unit, the dental scanning system with one or more network elements.

3. The dental scanning system according to any of the preceding items, wherein the session module is configured to establish the scanning session in response to a trigger event that initiates a request for the scanning session.

4. The dental scanning system according to any of the preceding items, wherein the trigger event comprises transferring a scanner credential associated with the dental scanning system at an identification network element comprised in the network.

5. The dental scanning system according to any of the preceding items, wherein the scanner credential comprises information that allows identification of the dental scanning system at the identification network unit.

6. The dental scanning system according to any of the preceding items, the network operation module further comprises a discovery module configured to transmit a scanner identifier associated with the dental scanning system to the network.

7. The dental scanning system according to any of the preceding items, wherein the scanner identifier comprises at least one of a device identifier uniquely identifying the dental scanning system;

a service identifier defining the service offered by the dental scanning system; and a domain identifier defining location of the dental scanning system in the network.

8. The dental scanning system according to any of the preceding items, wherein the dental scanning system is i) a handheld scanning device; or ii) a handheld scanning device in a wired connection with at least one wireless unit, wherein the at least one wireless unit comprises one or more of the wireless network unit configured to wirelessly connect the handheld scanning device to the one or more network element, the discovery module configured to transmit the scanner identifier associated with the handheld scanning device to the network, and the session module configured to establish the scanning session by operationally connecting, via the wireless network unit, the handheld scanning device with the one or more network elements; and the handheld scanning device comprises other of the one or more of the wireless network unit, discovery module or session module.

9. The dental scanning system according to any of the preceding items, wherein the discovery module is configured to transmit an operational state relating to the dental scanning system to the at least one or more network elements.

10. The dental scanning system according to any of the preceding items, the operational state comprises at least one of an idle state defined by an available state; or a non-idle state defined by an unavailable state.

11. The dental scanning system according to any of the preceding items, wherein the available state is defined by the dental scanning system in a switched-ON mode and not in operational connection with any other network element; and the unavailable state is defined by the dental scanning element in a switched OFF mode or a switched-ON mode non-idle state comprising the dental scanning system being in a switched-ON mode and in operational connection with any other network element, 12. The dental scanning system according to any of the preceding items, wherein the session module, in response to the input of the scanner credential at the identification network unit, is configured to operationally connect the dental scanning system with the one or more network elements comprising at least one of a default group of network element comprising the one or more network elements associated with the dental scanning system and/or associated with the identification network element; or a group based on a manual selection of the one or more network elements from a selection pool comprising at least the one or more network elements as selectable entries.

13. The dental scanning system according to any of the preceding items, wherein the discovery module is configured to receive element identifier of the at least the one or more network elements.

14. The dental scanning system according to any of the preceding items, further comprising a memory comprising a record of at least the one or more network elements along with respective element identifier of at least the one or more network elements.

15. The dental scanning system according to any of the preceding items, wherein the discovery module is configured to receive operational state of at least the one or more network elements.

16. The dental scanning system according to any of the preceding items, further comprising a memory comprising a record of at least the one or more network elements along with respective operational state of at least the one or more network elements.

17. The dental scanning system according to any of the preceding items, wherein the session module is configured to access the record from the memory of the dental scanning system and establish the connection between the dental scanning system with the one or more network elements based on the record.

18. The dental scanning system according to any of the preceding items, wherein the connection between the dental scanning system and the one or more network elements is dependent upon hierarchy of the dental scanning system relative to the other network elements in the network.

19. The dental scanning system according to any of the preceding items, wherein the connection between the dental scanning system and the one or more network elements is dependent upon access rights assigned to the dental scanning system.

20. The dental scanning system according to any of the preceding items, wherein the discovery module is configured to
send a query to the network; and
update a record comprising a locally stored record based on a response received for the query, wherein the session module is configured to establish the connection between the dental scanning system and the one or more network elements based on the updated record.

21. The dental scanning system according to any of the preceding items, where the discovery module is configured to
send a request, to a network element, for transmission of a collective record of at least the one or more network elements and respective operational state; and
receive the collective record, wherein the session module is configured to establish the connection between the dental scanning system with the one or more network elements based on the received collective record.

22. The dental scanning system according to any of the preceding items, wherein the discovery module is configured to
transmit operational state of the dental scanning system at a regular interval of a first time period; and/or
receive operational state of the at least one or more network elements at a regular interval of a second time period, wherein the second time period is shorter than lifespan of the operational state in the record.

23. The dental scanning system according to any of the preceding items, wherein the session module is configured to
send a request to the at least one or more network elements for establishing the connection between the dental scanning system and the one or more network elements; or
receive a request from the at least one or more network elements for establishing the connection between the dental scanning system and the one or more network elements.

24. The dental scanning system according to any of the preceding items, wherein a response to the request for establishing connection comprises application-dependent information for establishing the connection, the application-dependent information comprising encryption keys, and IP addresses or opened User Datagram Protocol (UDP) Ports.

25. The dental scanning system according to any of the preceding items, wherein the dental scanning system, connected in the scanning session, is configured to establish an operational connection with at least one additional network element without interrupting operational connection among the one or more network elements already connected in the scanning session.

26. The dental scanning system according to any of the preceding items, wherein the session module is configured to disconnect the dental scanning system from the operationally connected one or more network elements without affecting the operational connection between the one or more network elements.

27. The dental scanning system according to any of the preceding items,
further comprising a memory configured to retain session information associated with the scanning session when the handheld device from the scanning session changes its mode from ON to OFF during the scanning session; and
wherein the session module is configured to reconnect, using the session information, the dental scanning system in the scanning session after the dental scanning system changes the mode from OFF to ON.

28. The dental scanning system according to any of the preceding items, wherein the memory is configured to retain session information associated with the scanning session for a predefined time period.

29. The dental scanning system according to any of the preceding items, wherein the session module is configured to reconnect using the session information when the dental scanning system changes the mode from OFF to ON within the predefined time period.

30. The dental scanning system according to any of the preceding items, wherein the discovery module is configured to operate using Multicast Domain Name System (mDNS)/Unicast Domain Name System (uDNS) and Domain Name System-Service Discovery protocols.

31. The dental scanning system according to any of the preceding items, wherein the discovery module is configured to utilize DNS Record comprising Service Record (SRV Record) and/or Text Record (TXT Record).

Although some embodiments have been described and shown in detail, the disclosure is not restricted to such details, but may also be embodied in other ways within the scope of the subject matter defined in the following claims. In particular, it is to be understood that other embodiments may be utilized and structural and functional modifications may be made without departing from the scope of the present invention. Furthermore, the skilled person would find it apparent that unless an embodiment is specifically presented only as an alternative, different disclosed embodiments may be combined to achieve a specific implementation and such specific implementation is within the scope of the disclosure.

A claim may refer to any of the preceding claims, and "any" is understood to mean "any one or more" of the preceding claims.

It should be emphasized that the term "comprises/comprising/including" when used in this specification is taken to specify the presence of stated features, integers, operations, steps or components but does not preclude the presence or addition of one or more other features, integers, steps, components or groups thereof.

In claims enumerating several means, several of these means can be embodied by one and the same item of hardware. The mere fact that certain measures are recited in mutually different dependent claims or described in different embodiments does not indicate that a combination of these measures cannot be used to advantage.

We claim:
1. A dental scanning system for acquiring data from a three-dimensional dental object during a scanning session, the dental scanning system comprising:
an illumination unit comprising a light source configured to illuminate the three-dimensional dental object;
a detector unit comprising a sensor configured to receive a plurality of two-dimensional images in response to the illumination of the three-dimensional dental object;
a processor configured to generate processed data during a scanning session by processing one or more of the plurality of two-dimensional images, wherein a three- dimensional digital representation of the three-dimensional dental object is generated based on the processed data; and a wireless network unit configured to connect the dental scanning system to a network comprising a plurality of network elements including at least one network element configured to receive the processed data; and a network operation module comprising a session module configured to establish a scanning session by operationally connecting, via the wireless network unit, the dental scanning system with one or more of the plurality of network elements; and wherein the connection between the dental scanning system and the one or more of the plurality of network elements is dependent upon:

a hierarchy of the dental scanning system relative to the plurality of network elements, or access rights assigned to the dental scanning system.

2. The dental scanning system according to claim 1, wherein the session module is configured to establish the scanning session in response to a trigger event that initiates a request for the scanning session, and wherein the trigger event comprises transferring a scanner credential associated with the dental scanning system at an identification network element comprised in the network.

3. The dental scanning system according to claim 1, wherein the one or more network elements are hierarchically ranked with respect to one another network elements.

4. The dental scanning system according to claim 1, wherein the one or more network elements are manually hierarchy ranked, or hierarchy ranked based on a service offered by the one or more network elements.

5. The dental scanning system according to claim 1, comprising a service-providing network element is configured to provide services to the dental scanning system, and wherein the dental scanning system is configured to access the services based on hierarchy of the dental scanning system or the access rights assigned to the dental scanning system.

6. The dental scanning system according to claim 5, wherein the access right includes right to override an existing operational connection of the service-providing network element with other network elements.

7. The dental scanning system according to claim 1, wherein the discovery module is configured to
transmit operational state of the dental scanning system at a regular interval of a first time period; and/or
receive operational state of the at least one or more network elements at a regular interval of a second time period, wherein the second time period is shorter than lifespan of the operational state in the record.

8. The dental scanning system according to claim 1, further comprising a memory configured to retain session information associated with the scanning session when the handheld device from the scanning session changes its mode from ON to OFF during the scanning session; and wherein the session module is configured to reconnect, using the session information, the dental scanning system in the scanning session after the dental scanning system changes the mode from OFF to ON.

9. The dental scanning system according to claim 1, wherein the memory is configured to retain session information associated with the scanning session for a predefined time period.

10. The dental scanning system according to claim 1, wherein the session module is configured to reconnect using the session information when the dental scanning system changes the mode from OFF to ON within the predefined time period.

11. The dental scanning system according to claim 1, wherein the discovery module is configured to operate as a multicast system or a unicast system.

12. The dental scanning system according to claim 1, wherein the discovery module is configured to operate using Multicast Domain Name System (mDNS)/Unicast Domain Name System and Domain Name System-Service Discovery protocols.

13. The dental scanning system according to claim 12, wherein the characterizing aspect comprise at least one of unique name of the network element, operational status, Time-to-Live, or service offered by the network element.

14. The dental scanning system according to claim 1, wherein the discovery module is configured to utilize DNS Record comprising Service Record (SRV Record) and/or Text Record (TXT Record).

15. The dental scanning system according to claim 1, wherein the discovery module is configured to utilize custom Record characterizing the service, wherein characterization of the service in the custom Record is based on more than one characterizing aspect in a single data packet.

16. The dental scanning system according to claim 1, wherein the scanning session comprises at least a time period during which data such as depth data and/or color data from the three-dimensional dental object is acquired directly from the patient's oral cavity.

17. The dental scanning system according to claim 1, wherein the data is acquired in a single patient visit.

18. The dental scanning system according to claim 1, wherein the default group is configured to be used in multiple scanning sessions for same or different patient; or the customized group is created immediately prior to initiating establishing the scanning session, and used for a single scanning session.

19. The dental scanning system according to claim 1, wherein the connection between the dental scanning system and the one or more of the plurality of network elements is dependent upon the hierarchy of the dental scanning system relative to the plurality of network elements.

20. The dental scanning system according to claim 1, wherein the connection between the dental scanning system and the one or more of the plurality of network elements is dependent upon the access rights assigned to the dental scanning system.

* * * * *